US012730087B2

(12) United States Patent
Botte et al.

(10) Patent No.: US 12,730,087 B2
(45) Date of Patent: Sep. 8, 2026

(54) RAPID AIRBORNE VIRAL SENSOR AND METHODS RELATED THERETO

(71) Applicant: Texas Tech University System, Lubbock, TX (US)

(72) Inventors: Gerardine G. Botte, Lubbock, TX (US); Ashwin Ramanujam, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 669 days.

(21) Appl. No.: 17/373,515

(22) Filed: Jul. 12, 2021

(65) Prior Publication Data

US 2022/0018797 A1 Jan. 20, 2022

Related U.S. Application Data

(63) Continuation-in-part of application No. 16/933,686, filed on Jul. 20, 2020, now Pat. No. 11,060,995.

(51) Int. Cl.
*G01N 27/327* (2006.01)
*G01N 27/407* (2006.01)

(52) U.S. Cl.
CPC ..... *G01N 27/3275* (2013.01); *G01N 27/3271* (2013.01); *G01N 27/4075* (2013.01)

(58) Field of Classification Search
CPC ...... G01N 33/497; G01N 1/22; G01N 1/2202; G01N 1/2205; G01N 1/2214; G01N 1/2273; G01N 2001/2217; G01N 2001/222; G01N 2001/2223; G01N 2001/2276; G01N 2001/2285; G01N 33/5308; G01N 33/5438; G01N 33/54386; G01N 27/3277; G01N 2458/30
See application file for complete search history.

(56) References Cited

U.S. PATENT DOCUMENTS 2,519,284 A 8/1950 Ray et al.
5,509,410 A 4/1996 Hill et al.
(Continued)

FOREIGN PATENT DOCUMENTS

JP 2017096727 A * 6/2017 ............ G01N 27/28
WO 2020072446 A1 4/2020

OTHER PUBLICATIONS

Cheng et al. "Fabrication of NiOOH/Ni(OH)2@C Electrode for Detecting Blood Glucose by Composited Plating Method," Int. J. Electrochem. Sci., 11 (2016) 6085-6094 (Year: 2016).*
(Continued)

*Primary Examiner* — Alexander S Noguerola
(74) *Attorney, Agent, or Firm* — Dickinson Wright PLLC; Kristopher Lance Anderson

(57) ABSTRACT

The present invention provides for a device and method for the rapid detection (within seconds) of viruses and virions (proteins and nucleic acids) found in novel coronavirus (SARS-CoV-2) and other viruses through testing of an air sample. The device can be used at front line, hospitals, clinical laboratories, airports, groceries, homes, and the like. The device can be used as a single probe for single use or home use for fast detection of multiple samples simultaneously. The present invention would facilitate multiple testing at times of pandemics caused by airborne viruses when a large number of samples have to be tested in short periods of time.

25 Claims, 20 Drawing Sheets

(56) References Cited

U.S. PATENT DOCUMENTS

| | | | | |
|---|---|---|---|---|
| 5,653,864 | A * | 8/1997 | Gotoh ................ | G01N 27/3273 204/403.09 |
| 11,060,995 | B1 | 7/2021 | Botte et al. | |
| 2002/0123048 | A1 | 9/2002 | Gau | |
| 2014/0014534 | A1 | 1/2014 | Surareungchai et al. | |
| 2019/0242807 | A1* | 8/2019 | Marchand ............ | G01N 15/042 |
| 2022/0018797 | A1 | 1/2022 | Botte et al. | |

OTHER PUBLICATIONS

Anaout et al., "SARS-CoV2 Testing: The Limit of Detection Matters," Version 1. bioRXIV Preprint Jun. 4, 2020 National Institutes of Health (Year: 2020).*
Brigand et al., "Assessment of Air Contamination by SARS-CoV-2 in Hospital Settings," JAMA Network Open 2020;3(12):e2033232. doi:10.1001/jamanetworkopen.2020.33232 (Year: 2020).*
Wyllie et al., "Saliva is more sensitive for SARS-CoV-2 detection in COVID-19 patients than nasopharyngneal swabs," medRxiv preprint doi: https://doi.org/10.1101/2020.04.16.20067835; this version posted Apr. 22, 2020 (Year: 2020).*
Bhardwaj et al., "Rapid Airborne Influenza Virus Quantification Using an Antibody-Based Electrochemical Paper Sensor and Electrostatic Particle Concentrator," Environ. Sci. Technol. 2020, 54, 10700-10712 (Year: 2020).*
EPO computer-generated English language translation of Sato et al. JP 201796727 A, patent published Jun. 1, 2017, translation downloaded Jan. 20, 2022 (Year: 2017).*
Kim et al., "Electrochemical Detection of Influenza Virus Using Air Sampling System," Aerosol and Air Quality Research, 18:2721-2727, 2018 (Year: 2018).*
Grant et al., "Analysis of the SARS-CoV-2 spike protein glycan shield reveals implications for immune recognition," Nature—Scientific Reports (2020) 10:14991 (Year: 2020).*
Sarah Everts, "Structure of the Measles Virus Nucleocapsid Reveals How It Wraps Up Its Genome," C&EN Biological Chemistry, vol. 93, issue 16, Apr. 16, 2015 (Year: 2015).*
Brgles et al., "Identification of mumps virus protein and lipid composition by mass spectrometry," Virology Journal (2016) 13:9 (Year: 2016).*
Muyangwa et al., "Hantaviral Proteins: Structure, Functions, and Role in Hantavirus Infection," Frontiers in Microbiology Nov. 2015| Article 1326 (Year: 2015).*
About Nickel, Fun facts about nickel element on the Nickel Institute website downloaded Sep. 10, 2020 from https://nickelinstitute.org/about-nickel#01-nickel-properties (Year: 2020), 10 pages.
Aydin et al. "HIV/SARS-CoV-2 coinfected patients in Istanbul, Turkey" Journal of Medical Virology (2020) doi:10.1002/imv.25955, 4 pages.
Azzi et al. "Saliva is a reliable tool to detect SARS-CoV-2" Journal of Infection 81, e45-e50 (2020), 6 pages.
Balu, A.. et al., "A Deep Learning Framework for Design and Analysis of Surgical Bioprosthetic Heart Valves". Sci. Rep. 9, 1-12 (2019). 13 pages.
Bilder et al. "Salivary Detection of H1N1 Virus: A Clinical Feasibility Investigation" J Dent Res 90, 1136-1139 (2011), 4 pages.
Blaschke et al. "Non-invasive sample collection for respiratory virus testing by multiplex PCR" Journal of Clinical Virology 52, 210-214 (2011), 5 pages.
Clean Room & ISO Classifications | https://www.americancleanrooms.com/cleanroom-classifications/.
Cooper, C., et al., Air Pollution Control: A Design Approach (Fourth Ed., Waveland Press, 2010). 3 Pages.
D'Arienzo et al. "Assessment of the SARS-COV-2 basic reproduction No. R0, based on the early phase of COVID-19 outbreak in Italy" Biosafety and Health 2 (2020) 57-59, 3 pages.
Dheda et al. "Diagnosis of COVID-19: Considerations, Controversies and Challenges in South Africa" Wits Journal of Clinical Medicine 2, 3 (2020), 8 pages.
Gandhi et al. "Asymptomatic Transmission, the Achilles' Heel of Current Strategies to Control Covid-19" The New England Journal of Medicine 382, 2158-2160 (2020), 4 pages.
Giannotti, M. et al. "Family adjustment to COVID-19 lockdown in Italy: Parental stress, coparenting, and child externalizing behavior", Family Process Wiley, 2021;00:1-19. 20 pages.
Gupta et al., "Correlation of salivary glucose level with blood glucose level in diabetes mellitus," Journal of Oral Maxillofacial Pathology Sep.-Dec. 2017; 21(3): 334-339 (Year: 2017), 16 pages.
Gutierres et al. "Point-of-Care Testing: An Introduction" The Annals of Pharmacotherapy 38, 119-125 (2004), 7 pages.
Huang, S., et al. "Fusion of medical imaging and electronic health records using deep learning: a systematic review and implementation guidelines". npj Digital Medicine (2020) doi:10.1038/s41746-020-00341-z. 9 pages.
Huang, Y., et al., "Structural and functional properties of SARS-CoV-2 spike protein: potential antivirus drug development for COVID-19," Acta Pharmacolgica Sinica (2020) 41: 1131-1149 (Year: 2020).
Humphrey et al. "A review of saliva: Normal composition, flow, and function" The Journal of Prosthetic Dentistry 85, 162-169 (2001), 8 pages.
Jiang "COVID-19 Diagnostics: Technologies, Players and Trends" IDTechEx. (accessed Jun. 19, 2020), 3 pages.
Kenarkoohi, A., et al., "Hospital indoor air quality monitoring for the detection of SARS-CoV-2 (COVID-19) virus". Sci. Total Environ. (2020) doi:10.1016/j.scitotenv.2020.141324. 5 pages.
Khodamoradi et al. "Co-infection of Coronavirus Disease 2019 and Influenza A: A Report from Iran" Arch Iran Med 23, 239-243 (2020), 6 pages.
Kim et al. "Comparison of Nasopharyngeal and Oropharyngeal Swabs for the Diagnosis of Eight Respiratory Viruses by Real-Time Reverse Transcription—PCR Assays" PLoS One vol. 6, Issue 6 (2011), 7 pages.
Kim et al. "Rates of Co-infection Between SARS-CoV-2 and Other Respiratory Pathogens" JAMA 323, 2085 (2020), 2 pages.
Kliger et al. "Cloaked similarity between HIV-1 and SARS-CoV suggests an anti-SARS strategy" BMC Microbiology 7 (2003), 7 pages.
Konala et al. "Co-infection with Influenza A and COVID-19" European Journal of Case Reports in Internal Medicine 7, 1 (2020), 4 pages.
Leal et al., "Physiochemical properties of mucus and their impact on transmucosal drug delivery," International Journal of Pharmaceutics 532 (2017) 555-572 (Year: 2017), 18 pages.
Li et al. "Early Transmission Dynamics in Wuhan, China, of Novel Coronavirus-Infected Pneumonia" The New England Journal of Medicine 382, 1199-1207 (2020), 10 pages.
Li et al. "Substantial undocumented infection facilitates the rapid dissemination of novel coronavirus (SARS-CoV-2)" Science 368, 489-493 (2020), 6 pages.
Liu et al. "Epithelial Cells Lining Salivary Gland Ducts are Early Target Cells of Severe Acute Respiratory Syndrome Coronavirus Infection in the Upper Respiratory Tracts of Rhesus Macaques" Journal of Virology 85, 4025-4030 (2011), 6 pages.
Lopin et al. "PSoC-Stat: A single chip open source potentiostat based on a Programmable System on a Chip" PLoS One 13, e0201353 (2018), 22 pages.
Mold Course Chapter 2: | Mold | US EPA. https://www.epa.gov/mold/mold-course-chapter-2. 13 pages.
Nakamura et al., "Diurnal Changes in Salivary Amino Acid Concentrations," in vivo 24: 837-842 (2010) (Year: 2010), 6 pages.
Parker et al. "HIV and SARS-CoV-2 co-infection: The diagnostic challenges of dual pandemics" S Afr Med J 110, (2020), 3 pages.
Pasomsub et al. "Saliva sample as a non-invasive specimen for the diagnosis of coronavirus disease 2019: a cross-sectional study" Clinical Microbiology and Infection (2020) doi:10.1016/j.cmi.2020.05.001, 4 pages.
Ramanujam et al. "Online Sensor Device for Rapid *Escherichia coli* Detection in Water" In ECS Meeting Abstracts; 2018, 1 page.
Ramanujam, A. et al. "Ultra-fast Electrochemical Sensor for Point-of-Care COVID-19 Diagnosis using Non-invasive Saliva Sampling", Processes 2021, 9, 1236. https://doi.org/10.3390/pr9071236.

(56) References Cited

OTHER PUBLICATIONS

Sabino-Silva et al. "Coronavirus COVID-19 impacts to dentistry and potential salivary diagnosis" Clinical Oral Investigations 24, 1619-1621 (2020), 3 pages.
Sartorius, "Collecting of Viruses and Phages with the Gelatin Membrane Filter Method". https://www.n-genetics.com/products/1249/1033/13673.pdf.
Seo et al. "Rapid Detection of COVID-19 Causative Virus (SARS-CoV-2) in Human Nasopharyngeal Swab Specimens Using Field-Effect Transistor-Based Biosensor" ACS Nano 14, 5135-5142 (2020), 8 pages.
Sindhu et al. "Saliva: A Cutting Edge in Diagnostic Procedures" Journal of Oral Diseases 2014, 1-8 (2014), 9 pages.
Tang et al. "Laboratory Diagnosis of COVID-19: Current Issues and Challenges" Journal of Clinical Microbiology vol. 58, Issue 6 e00512-20 (2020), 9 pages.
Thevenot et al. "Electrochemical Biosensors: Recommended Definitions and Classification*" Analytical Letters 34, 635-659 (2001), 28 pages.
To et al. "Consistent Detection of 2019 Novel Coronavirus in Saliva" Clinical Infectious Diseases vol. 71 (2020), 3 pages.
Vedharathinam et al. "Understanding the electro-catalytic oxidation mechanism of urea on nickel electrodes in alkaline medium" Electrochimica Acta 81, 292-300 (2012), 9 pages.
Verreault, D., et al., "Methods for Sampling of Airborne Viruses". Microbiol. Mol. Biol. Rev. 72, 413-444 (2008). 32 pages.
Von Der Weiden, S., et al., "Particle Loss Calculator—a new software tool for the assessment of the performance of aerosol inlet systems," 2 Atmospheric Measurement Techniques 479, (Sep. 1, 2009). 16 pages.
Wang et al. "Clinical Characteristics of 138 Hospitalized Patients With 2019 Novel Coronavirus-Infected Pneumonia in Wuhan, China" JAMA 323, 1061 (2020), 9 pages.
Wang et al. "Detection of SARS-associated Coronavirus in Throat Wash and Saliva in Early Diagnosis" Emerging Infectious Diseases 10, 1213-1219 (2004), 8 pages.
Wang et al. "Detection of SARS-CoV-2 in Different Types of Clinical Specimens" JAMA vol. 323, No. 18 (2020), 2 pages.
Williams et al. "Saliva as a non-invasive specimen for detection of SARS-CoV-2" Journal of Clinical Microbiology (2020) doi:10.1128/JCM.00776-20, 5 pages.
Xu et al. "Salivary Glands: Potential Reservoirs for COVID-19 Asymptomatic Infection" Journal of Dental Research 002203452091851 (2020) doi:10.1177/0022034520918518, 1 page.
Xu et el. "Beware of the second wave of COVID-19". The Lancet vol. 395, 1321-1322 (2020), 3 pages.
Yang et al. "PCR-based diagnostics for infectious diseases: uses, limitations, and future applications in acute-care settings." The Lancet Infectious Diseases 4, 337-348 (2004), 12 pages.
Yu, K., et al., "Improving the collection efficiency of the liquid impinger for ultrafine particles and viral aerosols by applying granular bed filtration," 101 Journal of Aerosol Science 133-143 (2016). 11 pages.
Zhu et al. "Co-infection of SARS-CoV-2 and HIV in a patient in Wuhan city, China" Journal of Medical Virology 92, 529-530 (2020), 3 pages.
Zou et al. "SARS-CoV-2 Viral Load in Upper Respiratory Specimens of Infected Patients" The New England Journal of Medicine 382, 1177-1179 (2020), 4 pages.
International Searching Authority, International Search Report and Written Opinion for PCT/US2021/1041318; date of mailing Nov. 12, 2021; 17 pages.
Patent Cooperation Treaty, International Preliminary Report on Patentability for PCT/US2021/1041318; date of mailing Feb. 2, 2023; 10 pages.

* cited by examiner

| Impinger Solution | KOH pH 12 70ml | DI Water 70ml | DI Water 70ml |
|---|---|---|---|
| Aerosolizer Solution | 250 ml DI water (1.5fg/L) | 250 ml DI water (1.5fg/L) | 250 ml DI water (1.5fg/L) |
| | | | |
| Time | Result | | |
| 5 min | False Negative | False Negative | True Positive |
| 10 min | True Positive | True Positive | True Positive |
| 15 min | True Positive | True Positive | True Positive |

| Time | Result (Tested Twice for each Experiment) | | | | | |
|---|---|---|---|---|---|---|
| | Dust Filter (+)<br>Dust (-)<br>Dryer(-) | Dust Filter (+)<br>Dust (-)<br>Dryer(+) | Dust Filter (+)<br>Dust (+)<br>Dryer(-) | | Dust Filter (+)<br>Dust (+)<br>Dryer(+) | |
| 5 min | True Positive ✓ | True Positive ✓ | False Negative ✕ | False Negative ✕ | False Negative ✕ | True Positive ✓ |
| 10 min | True Positive ✓ | True Positive ✓ | False Negative ✕ | | True Positive ✓ | |

| # | Virus conc. in air (viron/L) | Flow rate for air sampling (mL/min) | Percentage of virus leave Dust filter(%) | Percentage of virus leave Dryer (%) | Impingement Time (min) | Efficiency of Trap (Impinger/beads, %) | Trap/Rinse solution volume (mL) | Final Conc. in Liquid phase (particle/L) | Final Conc. In Liquid phase (fg/L) |
|---|---|---|---|---|---|---|---|---|---|
| 1 | 1 | 1750 | 96.00% | 99.40% | 5 | 34.00% | 70 | 40.555 | 0.608 |
| 2 | 1 | 1750 | 96.00% | 99.40% | 5 | 99.00% | 70 | 118.087 | 1.771 |
| 3 | 1 | 15 | 96.00% | 99.40% | 5 | 99.00% | 70 | 1.012 | 0.015 |

| # | Virus conc. in air (viron/L) | Flow rate for air sampling (mL/min) | Percentage of virus leave Dust filter(%) | Collection Time (min) | Efficiency of Trap (Wet Impinger, %) | Trap/Rinse solution volume (mL) | Final Testing solution volume (mL) | Final Conc. in Liquid phase (particle/L) | Final Conc. In Liquid phase (fg/L) |
|---|---|---|---|---|---|---|---|---|---|
| 1 | 1 | 1 | 96.00% | 5 | 99.00% | 1 | 1 | 4.752 | 0.071 |
| 2 | 1 | 1 | 96.00% | 5 | 34.00% | 1 | 1 | 1.632 | 0.024 |

| # | Virus conc. in air (viron/L) | Flow rate for air sampling (mL/min) | Percentage of virus leave Dust filter(%) | Collection Time (min) | Efficiency of Trap (Glass Beads, %) | Trap/Rinse solution volume (mL) | Final Testing solution volume (mL) | Final Conc. in Liquid phase (particle/L) | Final Conc. In Liquid phase (fg/L) |
|---|---|---|---|---|---|---|---|---|---|
| 1 | 1 | 1 | 96.00% | 5 | 36.00% | 0.5 | 2 | 0.864 | 0.013 |
| 2 | 1 | 1 | 96.00% | 5 | 36.00% | 0.5 | 0.5 | 3.456 | 0.052 |

| # | Virus conc. in air (viron/L) | Flow rate for air sampling (mL/min) | Percentage of virus leave Dust filter(%) | Collection Time (min) | Efficiency of Trap (Nanoporous filter, %) | Trap/Rinse solution volume (mL) | Final Testing solution volume (mL) | Final Conc. in Liquid phase (particle/L) | Final Conc. In Liquid phase (fg/L) |
|---|---|---|---|---|---|---|---|---|---|
| 1 | 1 | 1 | 96.00% | 5 | 70.00% | 0.5 | 2 | 1.68 | 0.025 |
| 2 | 1 | 1 | 96.00% | 5 | 70.00% | 0.5 | 0.5 | 6.72 | 0.101 |

RAPID AIRBORNE VIRAL SENSOR AND METHODS RELATED THERETO

CROSS-REFERENCE TO RELATED APPLICATIONS

The present application is a continuation-in-part application of U.S. patent application Ser. No. 16/933,686 with a filing date of Jul. 20, 2020, entitled "Rapid Viral Diagnostic Sensor" and which is hereby incorporated herein by reference in its entirety for all purposes.

TECHNICAL FIELD

The present invention relates in general to the field of pathogen detection technologies. In particular, the system provides for rapid detection of airborne viruses and virions. The device and method for rapid detection of viruses and virions in accordance with the present invention results in rapid detection of them in air samples. The disclosed systems and methods support detection in the novel coronavirus (SARS-CoV-2) and related products and services.

STATEMENT OF FEDERALLY FUNDED RESEARCH

None.

BACKGROUND OF THE INVENTION

With the total number of confirmed cases related to SARS-CoV-2 crossing the 4 million mark, along with the death of over 430,000 infected individuals (as per the Coronavirus Resource Center of Johns Hopkins University), it is critical to ensure early detection of individuals affected by this virus. Techniques like the quantitative reverse transcriptase polymerase chain reaction (qRT-PCR) require hours before they can confirm the presence or absence of the virus in a sample. There are increasing efforts to develop rapid, point-of-care detection devices, as accurate and real-time disease detection are of high significance now more than ever. However, there are currently no tests available that can detect airborne viruses. Such devices are necessary for anywhere that presents a risk for SARS-CoV-2 transmission starting from hospitals, clinical laboratories to airports, grocery stores and other places where there are people still gathering for basic needs. Apart from these places, if such airborne virus detection devices are commercially feasible, the efforts to control the global SARS-CoV-2 pandemic would be given a powerful and effective management tool.

SUMMARY OF THE INVENTION

The present invention therefore enables the rapid airborne monitoring of viruses and virions (proteins and nucleic acids) found in novel coronavirus (SARS-CoV-2) and other pandemic viruses. The device can be used at front line, hospitals, point-of-care, clinical laboratories, airports, groceries, homes, and the like. This project will demonstrate the feasibility of the Ultra-fast Air COVID-19 sensor (A-UFC-19) to identify SARS-CoV-2 signatures for rapid indoor air monitoring (within seconds), to use these signatures capable of testing multiple room capacities. The present invention utilizes electrochemistry to detect SARS-CoV-2 to strategic and continuous monitoring of the virus in air. Viral detection of the present invention is further capable of detection of airborne viruses, including coronavirus (SARS-CoV-2), coronavirus, rhinovirus, varicella virus, measles, mumps, hantavirus, pandemic viruses, virus-laden particles and combinations thereof. The present invention directs air flow into a portable device that first cleans the air from contaminants, followed by air transfer into an electrolyte chamber to sense and report the virus presence within seconds. The present invention provides a sensor device that is capable of sampling indoor air continuously with test results every 5 minutes. The sensor device is capable of sending an alert to a network when the presence of SARS-CoV-2 is detected.

The present invention provides a portable sensor for COVID-19 diagnostics that would enable continuous monitoring for quantification of the virus in airborne samples. The proof of concept has been demonstrated and adapted for use with airborne samples.

The present invention provides for a standalone electrochemical sensor device with the ability to quantitatively detect the novel corona virus (SARS-CoV-2) in airborne samples in real time or near real time measurements. The present invention detects the presence of spike protein S1 of SARS-CoV-2 in a desired air sample. In one aspect the sensor of the present invention is able to indicate presence and absence of the viral protein and measure of the virus with a sensitivity of <0.1 particles per liter of the spike protein. The sensitivity of the sensor is 0.25 $(mA/cm^2)/(\mu g/mL)$ while its limit of detection is 0.04 μg/mL.

With the rapid detection of SARS-CoV-2 as provided by the present invention, diagnostics teams can extensively test indoor facilities and air samples to monitor SARS-CoV-2 virus shed in indoor air because: 1) the present invention relies on the fundamentals of electrochemistry to detect viral proteins as a timely and relevant diagnostic application; 2) the present invention provides fast (within less than one second), specific, and accurate response; 3) the sensor device features superb ease of operation; 4) specialized chemicals/supplies (e.g. viral transportation media or thermocyclers) are not required; the present invention is constructed with commercially available materials that can be obtained in bulk, which significantly lowers production costs and increases scalability tremendously; 5) the present invention implements electrolytes and technologies that are compatible with commercial indoor electrochemical sensors (e.g., CO, $CO_2$), and 6) results indicate that the sensor device of the present invention detects aerosolized SARS-CoV-2 proteins. It is a critical aspect of the present invention that it is capable of sampling air samples. The sensor is portable and envisioned to be integrated with its own electronics, and encrypted data storage components to store the results on cloud and made available via a mobile device application with dual-authentication sign-in to protect patient confidentiality.

The present invention may further comprise a processer, including machine learning (ML) integrated to demonstrate signatures of SARS-CoV-2 in a controlled air environment including environmental factors (temperature, relative humidity), environmental contaminants (dust, $CO_2$, CO), and virus contaminants that cause other human diseases (e.g., influenza and rhinovirus), including coronavirus, rhinovirus, varicella virus, measles, mumps, hantavirus, pandemic viruses, virus-laden particles and combinations thereof. The processor features will provide a robust platform for the sensitivity, specificity, and false alarm rates required for the sensor device and will enable fast extension to other pathogens beyond SARS-CoV-2.

In general, in one embodiment, the invention features a sensor for detecting a virus with a sensor tip. The sensor tip includes a working electrode that includes a conductive material that is resistant to corrosion, a support, and a catalyst. The sensor tip also includes a counter electrode with an electrocatalyst. The counter electrode is operably connected to the working electrode. The sensor tip allows for the change in current to be detected when the sensor tip is inserted into a sample, through the use of the working electrode and the counter electrode. By detecting the change in current, the sensor tip is able to detect the virus.

Implementations of the invention can include one or more of the following features:

The sensor can include a reference electrode that includes a reference material.

The reference material can be selected from a group consisting of Pt, Au, Ag, Ti, Rh, Ru, and combinations thereof.

The sensor tip when exposed to an air sample can detect change in current utilizing the reference material in combination with the working electrode and the counter electrode.

The support can be selected from a group consisting of Nickel, Nickel gauze, Nickel mesh, Ti, stainless steel, Hastelloy, graphite, nickel foam, Ti foam, Aluminum, Aluminum foam, carbon, carbon fibers, graphene, and graphene metal composites.

The catalyst can include a transition metal.

The transition metal can be selected from a group consisting of Ni, Fe, Co, Cr, Mo, Rh, Ru, Pd, Ir, Au, Pt, composites of graphene metal, and combinations thereof.

The transition metal can include Ni.

The support can include the catalyst.

The electrocatalyst can be selected from a group consisting of Pt, Au, Ir, Ni, Ti, Rh, Ru, and combinations thereof.

The virus being detected can be selected from a group consisting of airborne viruses, coronavirus (SARS-CoV-2), coronavirus, rhinovirus, varicella virus, measles, mumps, hantavirus, pandemic viruses, virus-laden particles and combinations thereof.

The sensor can detect the virus within a time period in the range between 10 milliseconds and 10 seconds.

In another aspect, the sensor can detect the virus within 100 milliseconds.

The sensor can detect concentration of the virus in an air sample.

The sensor can detect concentration of a second virus in the air sample.

In general, in another embodiment, the invention features a method for detecting a virus with a sensor tip. The method includes selecting a sensor tip, which has a working electrode including a conductive material, a counter electrode including an electrocatalyst, and a reference electrode that can be connected to the counter electrode and the reference electrode. The method further includes creating a catalyst locally on the sensor tip at a particular voltage corresponding to the working electrode and the reference electrode. The method further includes inserting the sensor tip into a contained air sample. The method further includes applying a cell voltage between the working electrode and the reference electrode. The method further includes holding the sensor tip at a particular temperature. The method further includes calibrating a change in current between a sample blank, which does not contain the virus, and the sample. In this method, the change in current is calibrated as a function of concentration of the virus present in the sample.

Implementations of the invention can include one or more of the following features:

The virus being detected can be selected from coronavirus (SARS-CoV-2), pandemic viruses, and combinations thereof.

The sensor can detect the virus within a time period in the range between 10 milliseconds and 10 seconds.

In another aspect, the sensor can detect the virus within 100 milliseconds.

The sample that the sensor tip is inserted into can include a single sample or multiple samples obtained from one or more indoor locations.

The single sample can enable calibrating a single probe.

The multiple samples can enable calibrating multiple probes simultaneously.

The sample can include electrolytes or pH adjusting salts.

The pH adjusting salts can be selected from a group consisting of KOH, NaOH, ammonium solutions, phosphate buffers, and combinations thereof.

The particular rotation speed can be in a range between 0 rpm and 3000 rpm.

The cell voltage can be in a range between −0.5 V and 1.0 V relative to voltage of the reference electrode.

The particular temperature can be in a range between 10° C. and 40° C.

The sensor can detect concentration of a second virus in the sample.

BRIEF DESCRIPTION OF THE DRAWINGS

For a detailed description of example embodiments, reference will now be made to the accompanying drawings in which.

DETAILED DESCRIPTION

Figure 1:
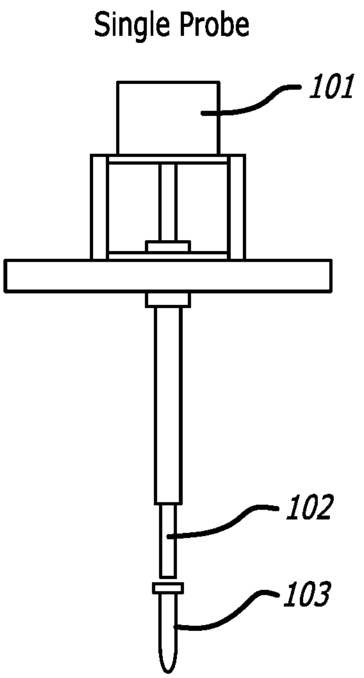
FIG. 1 depicts a schematic diagram of the device—a single probe—as implemented as the sensor of the present invention.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The coronavirus disease (COVID-19) pandemic has created both a public health crisis and an economic crisis in the United States and around the world. As of the drafting of this disclosure, the rapidly rising number of cases globally of COVID-19 was 22,522,749 with a death toll of 1,956,635 around the world and 400,000 deaths in the U.S. These numbers represent just over one year of incidences since the emergence of the virus. From an economic perspective, the United States experienced two consecutive quarters of declines in gross domestic product (GDP) and record hikes in unemployment due to economic shutdowns compelled by the pandemic. Since its first detection in China, COVID continues to spread with new variants emerging.

Detection of the virus in people is important for treating the sufferer and for slowing the spread of the disease. Likewise, environmental detection of the virus could contribute to methods for controlling and slowing the spread of the virus according to public health experts. There are several diagnostic methods for detecting the coronavirus in clinical, research, and public health laboratories. There are also methods for detecting the virus in environmental samples. Some studies suggest that increases in SARS-CoV-2 RNA can be detected in environmental samples several days before detection of COVID-19 through clinical surveillance methods, which could potentially lead to an early warning system for the presence of the virus in the environment.

There are several different types of bio-aerosol sampling including passive and active sampling that enable the capture and detection of airborne viruses like COVID-19.8 However, none of the currently commercially available methods to detect SARS-CoV-2 in air yield real-time detection. Current methods are based on collecting samples obtained from air filters and performing a reverse transcriptase polymer chain reaction (RTPCR), which requires takes several hours to yield results. Improvements to the current state of the art that enable real-time detection of SARS-CoV-2 in air in real-time would contribute significantly towards helping to control the spread of the virus and human infections.

The present invention utilizes a sampling and testing system for SARS-CoV-2 that is compatible with commercial air indoor monitoring electrochemical sensors (e.g., CO, CO2). The present invention employs an electrochemical system for continuous monitoring of indoor air every 5 minutes using an ultra-fast COVID-19 diagnostic sensor (UFC-19). The present invention integrates previously reported viral capture methods in a manner that does not require a liquid impinge to be collected in culture media to keep the virus alive. The invention includes air purification, impingement of the aerosol virus in an electrolyte solution, and the Ultra-Fast SARS-CoV-2 (UFC) probe, according to the inventors. When completely reduced to practice, the invention could ultimately provide the first real-time air sampling system for detecting the presence of SARS-CoV-2 in an indoor environment. This capability would significantly contribute to reducing the spread of the virus and human infections from this and future pathogenic threats.

The present invention will compete generally with traditional chemical and biochemical sensing platforms as well as sensing platforms for environmental pathogens. Public health experts have emphasized the importance of testing, tracking infected people, and tracing their contacts as an effective strategy to reduce the spread of the virus. As mentioned previously, there are existing methods for detecting the virus in environmental samples. There are also different types of bio-aerosol sampling including passive and active sampling that enable capturing and testing of airborne viruses like COVID-19 that are based on collecting samples obtained from air filters a performing RT-PCR. This invention would have a competitive advantage over these systems because they require several hours to yield results, whereas this invention will provide results in real-time.

In one embodiment, the present invention comprises an amperometric sensor, termed the UFC-19 sensor, that utilizes the constant potential oxidation of nickel hydroxide (Ni(OH)2) (or other potential transition metals, such as Co, Cr, Rh, Ir, Au, Pt, etc.) to nickel oxyhydroxide (NiOOH) (or equivalent) on a rotating disk electrode (RDE) in alkaline media (alkaline enough to increase the sensitivity of the sensor while maintaining the virions and viruses viable for quantification). The RDE technique is applied using a small size electrode (e.g., 1-5 mm diameter or microelectrodes <0.5 μm) to introduce controlled, consistent mass transport of hydroxyl ions, viruses, and/or virions to the surface of the electrocatalyst electrode and to provide a uniform current distribution on the electrode. FIG. 3A shows the configuration of the UFC-19 sensor including working electrode (WE) 302, reference electrode (RE) 301, and counter electrode (CE) 303. In the example, nickel (Ni) is used as working electrode 302, while Platinum (Pt) is used as the quasi-reference electrode 301 and counter electrodes 303 (due to its stability in the media), respectively.

Transition metals such as nickel, are converted into an electrocatalyst in-situ according to reaction (1) by applied a control potential:

$$Ni(OH)_2+OH^- \rightleftharpoons NiOOH+H_2O+e^- \quad (1)$$

UFC-19 is an electrochemical sensor with a nickel working electrode. When nickel is placed in an alkaline medium, it is chemically oxidized to nickel hydroxide. This nickel hydroxide upon electrochemical oxidation forms nickel oxyhydroxide as shown in reaction (1). In the presence of SARS-CoV-2 spike protein (found on outer surface of virions), modifications to the electrochemical oxidation reaction occur due to a competing reaction between the viral protein and hydroxyl ions at the electrode/electrolyte interface. This leads to a current response that is distinct from the current response obtained in the absence of the protein. This current distinction indicates if the viral protein is present in a sample or not present.

Viruses and virions interact with the electrode surface, such as an RDE Substrate/Support providing a nickel oxyhydroxide (NiOOH) electrocatalyst (or transition metal oxyhydroxide), as a result, the current is altered in contacting the an air sample comprising a virus when compared to blank air samples, indicating the presence of viruses, depending on the composition. The change in the current is associated with the concentration of the viruses, such as SARS-CoV-2. With the present invention, the air sample is controlled such that the current response is associated with the "species of interest" to be detected. That is a key aspect of the methodology or standard operating procedure for the sensor of the present invention.

A critical advantage of the UFC-19 sensor (over electrochemical biosensors) lies in the fact that the nickel oxyhydroxide (NiOOH) electrocatalyst (or transition metal oxyhydroxide) can be generated locally (in-situ) at the electrode surface as and when required. Hence, it eliminates the complications in design of enzymatic biosensors where there is always a potential threat that the inactivation of enzymes could hinder the sensing process. The catalyst is regenerated as needed enabling the reuse of the probe. In addition, the regeneration of the catalyst involves a strong alkaline (e.g., pH>14) environment which acts as a disinfection mechanism for the probe components, eliminating costs of probes disposal as in typical electrochemical biosensors.

The applied potential during the measurement can be calibrated for different viruses and virions (either proteins or nucleic acids) present in different types of viruses, enabling multiple detection of viruses and their discrimination in a single sample. In summary the technology enables: (1) fast detection of viruses, (2) resilient and reusable sensor tip, (3) discrimination of viruses in a single sample, (4) single and multiple measurements simultaneously.

The current state of art techniques for COVID-19 diagnosis include qRT-PCR based devices, lateral flow assays, point of care molecular diagnosis devices and their hybrid systems. Table 1 presents a comparison of the advantages of the RAnCODS-19 sensor, a sensor capable of detection of SARS-CoV-2, HIV and other viruses in a media sample, when compared to current methods. For, HIV the state of art diagnostic techniques include laboratory testing such as enzyme linked immunosorbent assays followed by Western blot analysis to ensure their successful detection.

TABLE 1

Comparison of RAnCODS-19 on various key parameters with currently available technologies for COVID-19 diagnostics.

| | qRT-PCR (device) | POC MDx (device) | LFAs (Device) | Hybrid Systems | RAnCODS-19 (present invention) |
|---|---|---|---|---|---|
| Limit of detection (copies/ml) | 100-1000 | 125-500 | N/A | 10-10000 | 0.04 μg/ml |
| Test time | >2 hours | 5-45 mins | 10-30 mins | 30-90 mins | <100 ms |
| Sample-answer time | ~4 to 6 days | ~1 hour | ~30 mins | >1 hour | ~2 mins (single probe) 15-30 s (multiprobe carousel) |
| Price (per test) | <$5 | $10 to $150 | $0.5 to $5 | Depends on technology | <$0.5 (cost of solutions) |
| Price (per platform) | $15k to $90k | $5k to $10k | <$1k | $500 to $5k | ~<$250 (single probe device)* ~<1.5k (multiprobe device)* |
| Sample Collection | Nasal Swab | Sputum | Finger Prick | Finger Prick | Saliva and blood plasma samples |

qRT-PCR: quantitative reverse transcriptase polymerase chain reaction, POC MDx: point-of-care molecular diagnostics, LFA: lateral flow assay.
*Assumes scale to manufacturing.

Prior references report an electrochemical microbial sensor for microbes present in water and food pathogens. However, it was not disclosed the application for viruses and virus particles such as virions or viral proteins of COVID-19, HIV, etc.

FIG. 1 shows a probe sensor operable to use with a method, in accordance with at least some embodiments. In some embodiments, the method includes selecting the probe sensor of FIG. 1, with the probe sensor having a sensor tip. In this embodiment, the sensor tip includes test electrodes. From this, the test electrodes can include a working electrode made at least partly of a conductive material, a counter electrode with an electrocatalyst, and a reference electrode. In some embodiments, the working electrode is operably connected to the counter electrode and the reference electrode. Further, the method followed in conjunction with the use of the probe sensor in FIG. 1 includes creating a catalyst locally on the sensor tip. This catalyst can be created at a particular voltage corresponding to the test electrodes.
As shown in FIG. 1, the tip of the probe sensor can be presented within the sample chamber, with the sample chamber containing a media. This media can include a composition, a biological sample, and pH adjusting salts. In some embodiments, the electric motor in FIG. 1 can be used to rotate the probe sensor tip at a particular rotation speed. By holding the probe sensor at a specific temperature and applying a cell voltage, in some embodiments, a change in current between a blank sample, which does not contain any viruses or virions, and the sample chamber can be calibrated as a function of the virus present in the sample chamber.

The disclosed system and method herein provide sufficient diagnostics while utilizing cheaper and portable components. Accordingly, a system and method are disclosed for analyzing presence of a virus in an airborne sample.

The present invention is an embodiment capable of testing the SARS-CoV-2 samples for commercial and individual use (e.g., home-based test kits). The single probe sensor consists of an electrode 102 setup attached with a motor 101, such as an electric to rotate the electrode as seen in FIG. 1. This device is further capable of having the electric circuits and data storage components integrated to it. The probe sensor detects SARS-CoV-2 by passing a specific voltage to the electrodes 102, which are deployed into a sample chamber 103 and obtaining a current response in return. The current response obtained is a result of an interaction between the electrochemical reaction occurring at the electrode 102 surface and the SARS-COV-2 present in the sample 103. Based on the concentration of SARS-CoV-2 protein in a given sample 103, the current response is modified.

Figure 2:
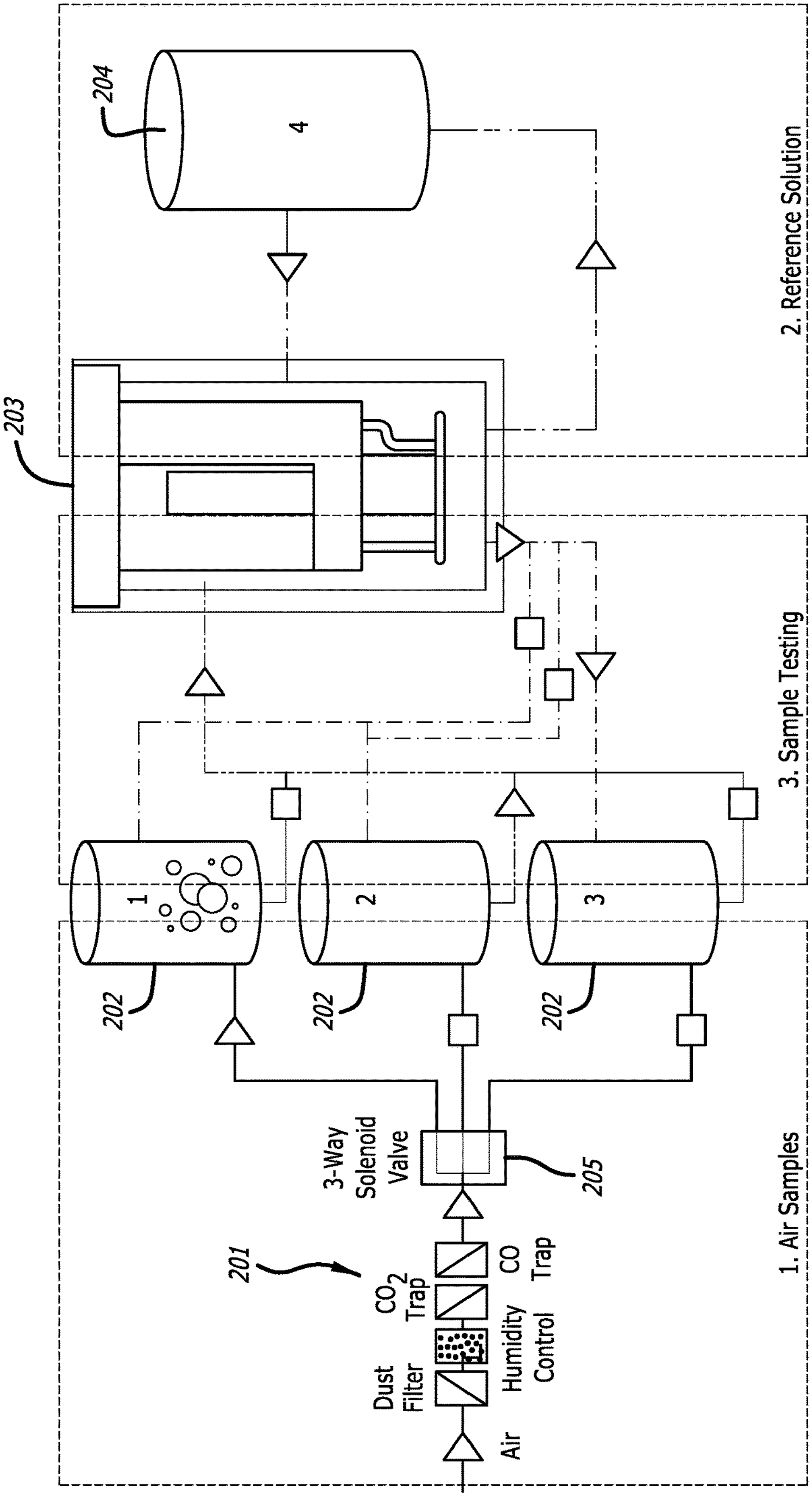
FIG. 2 depicts an example of a device for testing air samples, in accordance with at least some embodiment.

FIG. 2 presents a schematic of the airborne sensor of the present invention, the UFC-19. The system presented in FIG. 2 is compatible with commercial air indoor monitoring electrochemical sensors (e.g., CO, CO2), in which an electrolyte is maintained in the system to perform analysis. In one embodiment, the system integrates findings reported in the literature to capture viral pathogens, with the distinction that the present invention does not require a liquid impinger to be collected in a culture media to keep the virus alive, as the UFC-19 measurement is based on disintegration of viral particles to release the viral proteins with the aid of the KOH electrolyte and their interaction with the NiOOH electrocatalyst on the probe, as discussed herein via the probe sensor described in FIG. 1. In one embodiment the present invention, described in FIG. 2 provides for air purification 201 and control (removal of dust, water, CO2 and CO impurities), impingement of the aerosol virus (containers 1, 2, and 3) 202 in electrolyte solutions (e.g., KOH and/or PBS KOH mixtures, to be optimized); a UFC-19 probe 203, and baseline/electrolyte solution 204. Detailed explanation of these component and functions are described as follows.

While the present invention presents a preferred embodiment of potassium hydroxide (KOH) and PBS KOH mixtures as the operable electrolyte, additional electrolytes may be utilized, alone or in combination, including but not limited to: hydrochloric acid (HCL), hydrobromic acid (Hbr), hydroiodic acid (HI), nitric acid (HNO3), chloric acid (HClO3), perchloric acid (HClO4), sulfuric acid (H2SO4), sodium hydroxide (NaOH), potassium hydroxide (KOH), lithium hydroxide (LiOH), barium hydroxide (Ba(OH)2), calcium hydroxide (Ca(OH)2), sodium chloride (NaCl), potassium bromide (KBr), magnesium chloride (MgCl2) and known analogs and derivatives thereof commonly utilized for their ionization properties.

Air Sampling Impurities Control: It is an exemplary embodiment of the present invention to provide steps to eliminate/minimize dust, humidity, CO, and $CO_2$ in the air samples to achieve longer operation life of the system without the requirement of electrolyte solution cartridge replacement for the reference solution 204. The presence of dust in the electrolyte/sampling collection can affect virus detection. Similarly, the $CO_2$ in the air can eventually cause changes in pH over time (e.g. converting the KOH electrolyte into $K_2CO_3$) and humidity can dilute the electrolyte/sampling collection testing solution. Thus, the ambient air will be regulated (after a forced convection unit) with dust, humidity, CO, and CO2 filters 201 as shown in FIG. 2. After the ambient air is filtered, it is directed to at least one container 202 via a valve assembly 205. In one embodiment a single container 202 is utilized. In another embodiment more than one containers 202 are used. In another exemplary embodiment as shown in FIG. 2, a three-way solenoid valve 205 is utilized for three containers 202, with each container being activated, for example, every x minutes. In one embodiment each container 202 cycle is 1-5 minutes. In another embodiment, a series of containers 202 are utilized in increments, ranging from 2 to 300 containers 202. For example with the current three-container embodiment in FIG. 2, using a 5 minute cycle, in the first 5 minutes, the first container will be impinged, while the second container is getting tested for SARS-CoV-2 and discharged to the third container. Similarly, the first container will be tested while the second container 202 is impinged with air samples. This cycle will allow continuous sample diffusion from air to the solution while other containers are occupied for testing. Recirculation of the testing solution in the cartridges will improve mixing.

Reference solution: Before the sample in the first container 202 is fed to the probe, the 1M KOH (reference solution) in the reference solution cartridge 204 is directed to the probe for catalyst formation using cyclic voltammetry (typically <3 minutes). After the catalyst is formed, chronoamperometry is performed where a fixed potential is applied to achieve a baseline reading with this reference sample that does not contain any air samples (estimated to be 2 seconds).

Sample Testing: As shown in FIG. 2, after the air samples are diffused in the electrolyte solution that is in the sample container/cartridge 202, and a baseline reading is obtained with the probe 203, the air-impinged sample will be directed to the probe 203 for measurement. A chronoamperometry with conditions similar to that of baseline will be performed. Current signals from air diffused solution will be compared with the baseline to determine the presence or absence of SARS-CoV-2 in the solution. After the solution sample is tested, it is discharged from the probe 203 to the third sample container 202 to continue the test cycles.

It is expected the packing of the A-UFC-19 sensor (including electrolyte, impingent solutions, and probe) to be under 50 $cm^3$ (excluding the electronics). Air purification units 201 are expected to be packed in a small volume. In one embodiment (excluding air forced convection) the system of the present invention is expected to be low DC power consumption (~1 mW), as the cell voltage of the sensor is less than 2 V and the operating currents are about 100 μA.

The hardware utilized to collect and display the testing results can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. Process may encompass any of the foregoing hardware, either singly or in combination. The hardware may comprise memory that may comprise a single disk or a plurality of disks (e.g., hard drives), and includes a storage management module that manages one or more partitions within the memory. In some embodiments, the memory may include flash memory, semiconductor (solid state) memory or the like. The memory may include Random Access Memory (RAM), a Read-Only Memory (ROM), or a combination thereof.

Figure 3B:
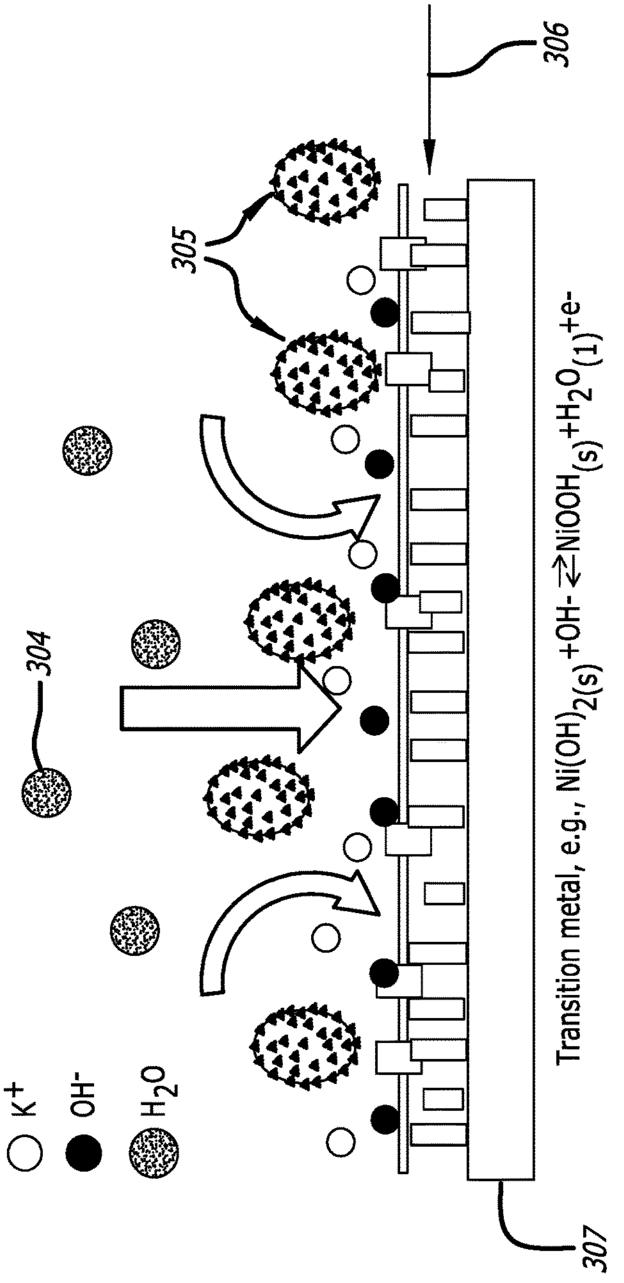
FIG. 3B depicts a schematic representation of the sensing mechanism for indication of the presence of a virus.
Figure 3A:
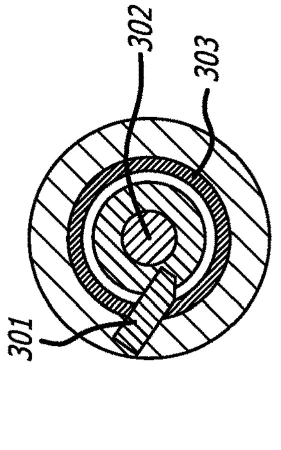
FIG. 3A depicts a sensor probe containing the working electrode (e.g., nickel disk substrate) at the center surrounded by a concentric counter electrode (e.g., Pt ring) and a small quasi reference electrode (e.g., Pt foil).

In some embodiments, the hardware associated with the sensor of the present invention may comprise an electronic device, such as a mobile app, via a network, as shown in FIG. 3B. The processors may be configured to communicate with the electronic device by uploading data into a cloud or other networked server. The processor may electrically communicate with the electronic device to facilitate communication between the sensor and the electronic device. It is to be appreciated the electronic device may be a computer, personal electronic device such as tablet, phone, watch, or any other electronic device (portable or non-portable, and including future electronic device). In some embodiments, the mobile app may be downloaded to the electronic device to facilitate communication between the sensor and the electronic device for interpreting the results obtained from the sensor. In some embodiments the mobile app includes a user interface for presenting information and receiving input or feedback from a user of the mobile app.

For the present invention, including as set forth in the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, valves and related valve actuator assemblies, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein, including an electronic device as described herein.

Figure 6:
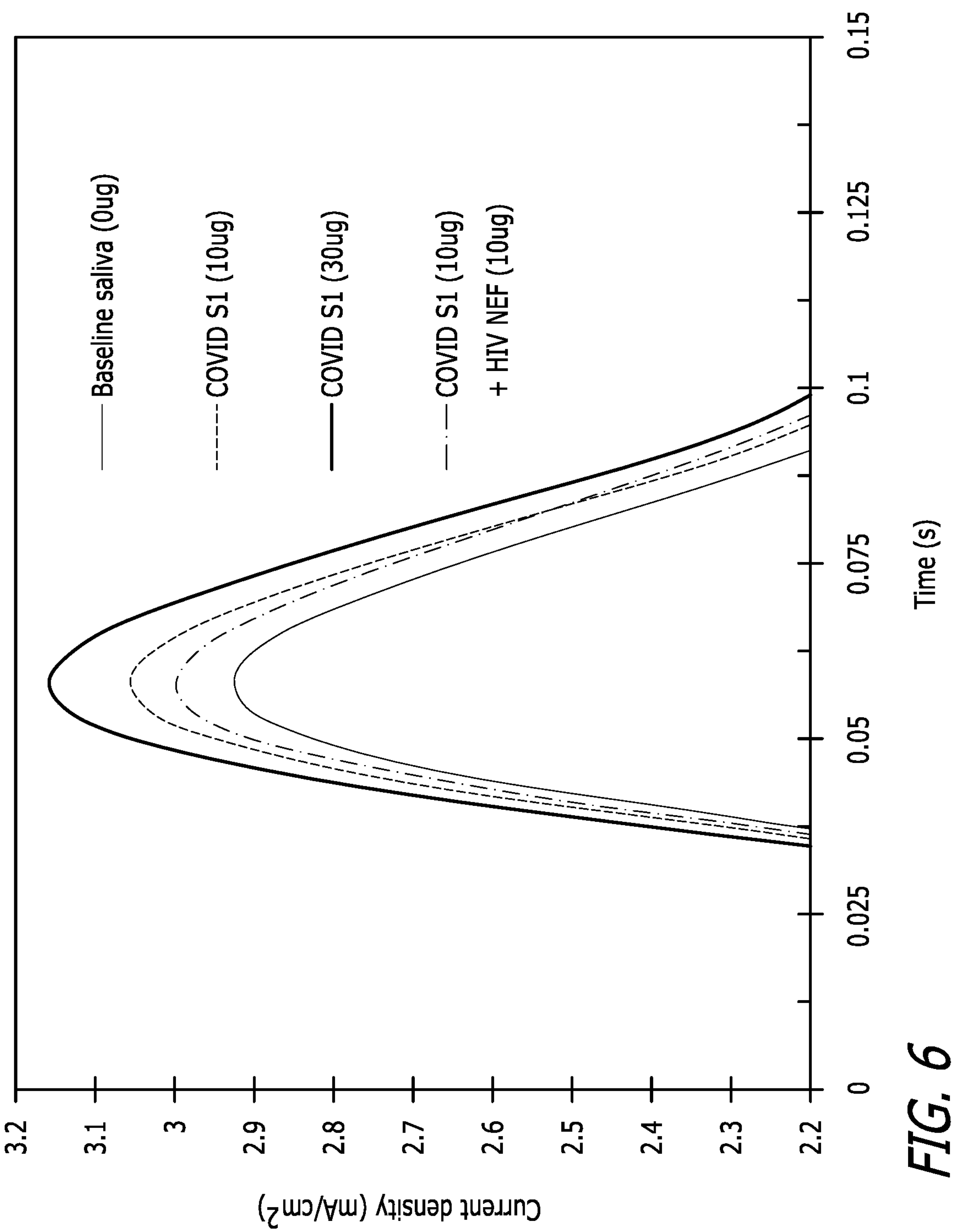
FIG. 6 depicts a chronoamperometry plot showing the difference in current between baseline and different concentrations of COVID-19 proteins, in accordance with at least some embodiments.

Rather than testing the SARS-CoV-2 proteins in phosphate buffer saline (PBS), an approach was made to validate the sensor probe of the present invention to test samples in a close-to-reality fluidic scenario wherein the sample collection was non-invasive (extends the applicability of the sensor as sample collection is easier). There are reports in the literature that up to 91.7% (11 out of 12) patients host detectable virus in saliva. Hence, for an exemplary embodiment a sample collection was a like field scenario where protein concentration of interest was mixed to 3 mL of medical-grade artificial saliva mixed with PBS and 1N potassium hydroxide solution (KOH) (commercial standardized solution) in a final volume of 20 mL to achieve a pH of 12. At such high pH, it is expected that cells and viruses will lyse and release proteins in solution. Therefore, present example benefited from the use of recombinant viral proteins. For this exemplary embodiment, two different concentrations of protein S1 of SARS-CoV-2 were tested in artificial saliva solution and the results are shown in FIG. 6. A clear distinction in current between the baseline (no protein) curve, and 10 μg and 30 μg of protein can be observed, meaning the protein in the solution has been detected. Even between the two different concentrations, there is a clear separation concluding the sensor of the present invention can be used to quantitatively detect coronavirus in saliva samples.

Figure 4:
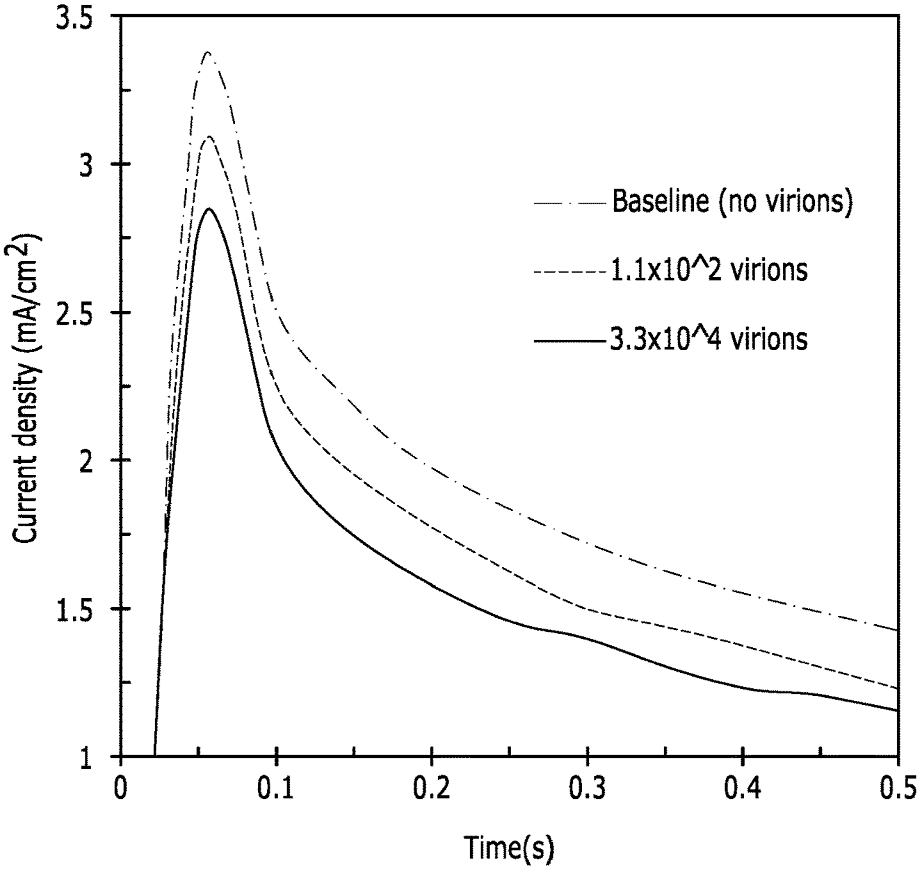
FIG. 4 depicts a chronoamperometry plot showing the difference in current between baseline and different concentrations of HIV virions, in accordance with at least some embodiments.

In one exemplary embodiment, a single probe sensor containing a sensor tip as shown in FIG. 1 with nickel working electrode and platinum counter and reference electrodes was coupled with a rotating disk electrode (Pine Instrument Company). These electrodes were dipped in 1M Potassium hydroxide (KOH) solution in water (Acros Organics' CAS #1310-58-3, 7732-18-5) and the electrocatalyst was created locally on the sensor tip by running cyclic voltammetry (CV) in potential window of 0.2 to 0.6V vs. Pt reference electrode. Once this catalyst was formed, the sensor was immersed in a 20 ml solution containing phosphate buffer solution (PBS) and KOH to obtain the background current in the absence of HIV virions. Chronoamperometry test was performed at a rotation speed of 1600 rpm by oxidizing the electrode at 0.58V vs. Pt followed by reduction at 0.1V vs. Pt to retrieve the original nickel surface. Following this, the electrocatalyst was created again by performing CV and subsequently used for testing a 20 ml solution of PBS, the virions to be detected, and KOH for adjusting the pH. The resulting current responses from background and HIV virion solutions were recorded and the plotted results showing the current separation between the background and different virion concentrations are shown in FIG. 4.

Figure 5:
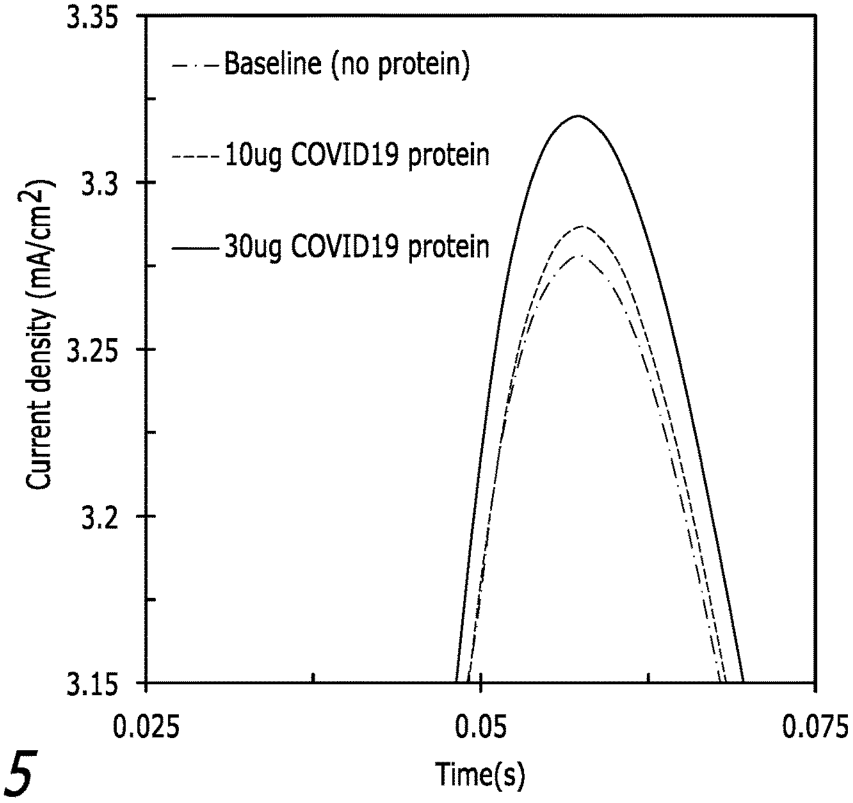
FIG. 5 depicts a chronoamperometry plot showing the difference in current between baseline and different concentrations of COVID-19 proteins.

In another exemplary embodiment, the sensor of the present invention was used for testing the spike proteins of virus causing COVID-19. The spike proteins were purchased from Ray Biotech (Recombinant SARS-CoV-2, S1 Subunit Protein, Code: 230-30162-100). The electrodes were immersed in KOH to form the electrocatalyst using the procedure for HIV virions. This electrocatalyst is used for obtaining the current response from background solution in the absence of COVID-19 proteins. Once the electrocatalyst was formed again by CV, the sensor tip was used for testing COVID-19 proteins of two different concentrations. The results from this exemplary embodiment (FIG. 5) revealed that the tested concentrations of COVID-19 proteins were distinguished by the sensor. The currents from COVID-19 protein are higher than the baseline current as compared to currents from HIV virions that have currents lower than baseline. This indicates the distinguishing factor for responses obtained from HIV virions as compared to COVID-19 proteins.

To further probe the specificity of UFC-19 in capturing signals from SARS-CoV-2, a mixed solution containing equal quantities (10 μg each) of SARS-CoV-2 protein and Human Immunodeficiency Virus (HIV) NEF protein was prepared and tested. The reason for choosing HIV was because both HIV and SARS-CoV-2 are enveloped viruses in which glycoproteins are required for viral binding and penetration of their nucleic acid material into susceptible host cells. Although HIV is not a respiratory virus, both HIV and SARS-CoV are pandemic viruses with similar underlying disease-causing mechanisms, including severe T cell cytopathic effects. The response in currents of the mixed solution was compared to the responses in current from same concentration (10 μg) of these individual proteins. The results of this comparison are also depicted in FIG. 6. It is evident that the solution containing mix of NEF and S1 proteins displayed responses more like the SARS-CoV-2 S1 protein alone. These responses even overlap around 75 ms showing that the S1 protein in mixed solution dominates and produces a current response almost similar as the response from 10 μg S1 protein only, thereby rendering specific detection of S1 protein over NEF protein.

Figure 7:
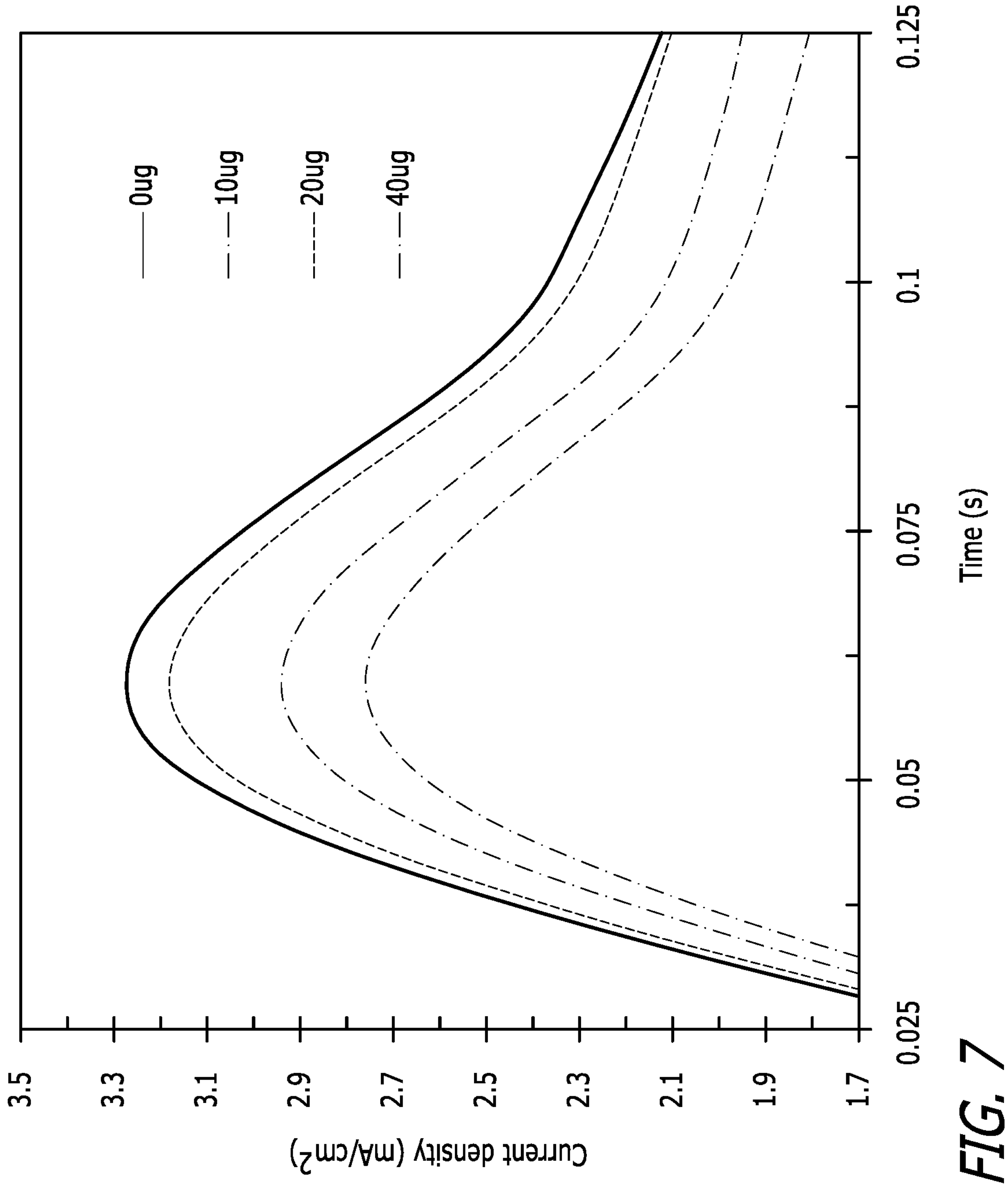
FIG. 7 depicts a chronoamperometry plot showing the difference in current between baseline and different concentrations of COVID-19 proteins, in accordance with at least some embodiments.

As an extension of the results of the previous examples, concentrations in the range of 10-40 μg diluted to 20 mL (0.5 to 2 μg/mL) were tested using the UFC-19 device of the present invention. The current responses increased with increase in protein concentration as seen in FIG. 7. Using the current density values at 50 ms time point, a calibration curve was plotted equating the current response as a function of concentration of SARS-CoV-2 spike protein. Least squares linear regression was used to fit the data points ($R^2$=0.89). The approach consisted of using viral protein concentrations that were unknown to the engineer who analyzed the data in a blind fashion. The obtained calibration equation was used for predicting the concentration of a sample. The calibration plot obtained by plotting the current density value at 50 ms for different protein concentrations tested (blue points). The white outlined point corresponds to the concentration of sample solution predicted using the calibration equation:

$$i\left(\frac{mA}{cm^2}\right) = 0.2478c\left(\frac{mA}{cm^2}\right) + 2.6819\left(\frac{mA}{cm^2}\right).$$

Figure 8:
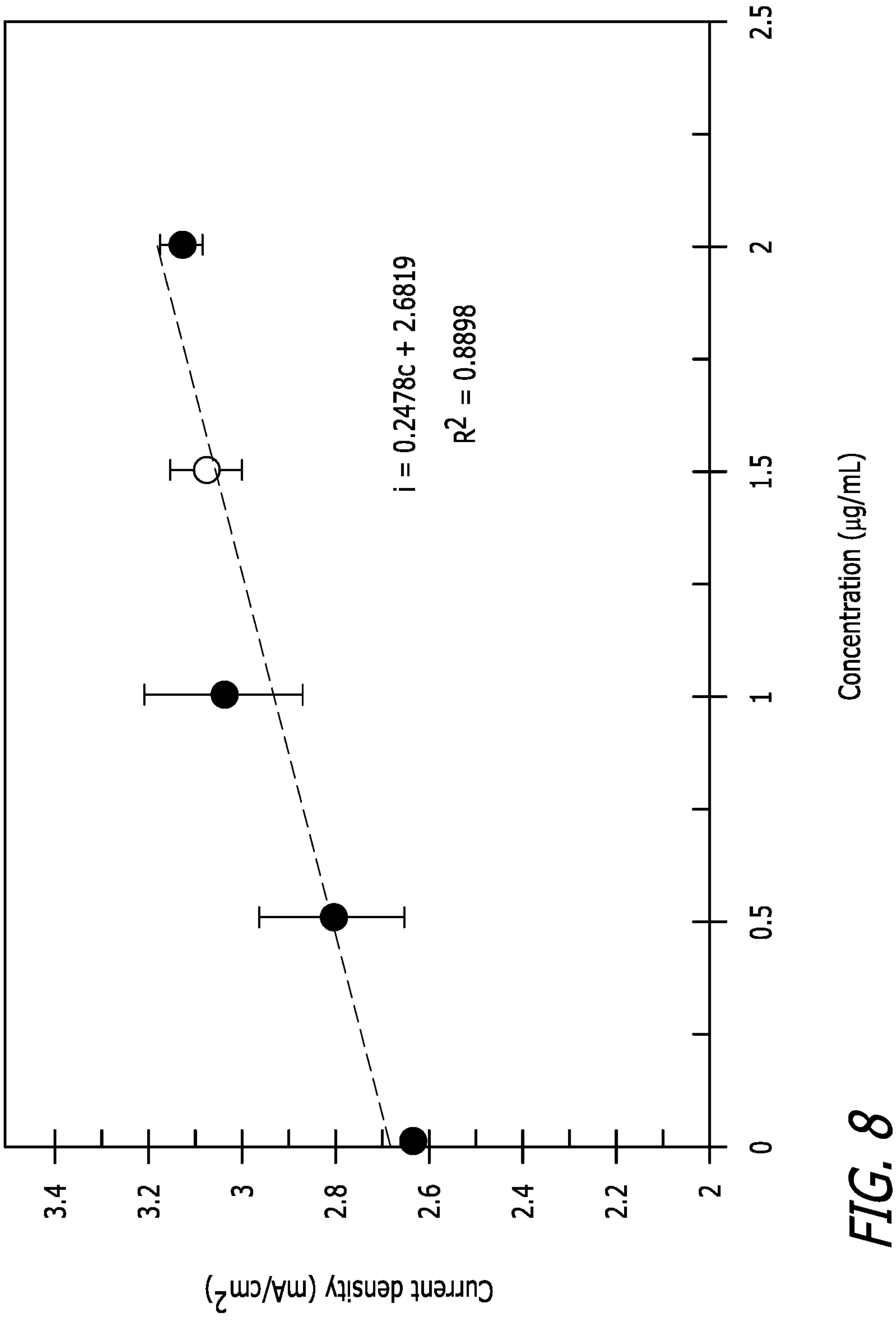
FIG. 8 depicts, a plot showing the difference in density between baseline and different concentrations of COVID-19 proteins in accordance with at least some embodiments.

The current density value recorded for the unknown sample at 50 ms was substituted in the calibration equation in order to obtain the concentration of the sample FIG. 8. The actual concentration of the sample was 1.5 μg/mL (30 μg) and the concentration predicted by UFC-19 prototype was 1.59 μg/mL (31.8 μg) with only 6% error compared to the actual concentration. Based on the slope of the calibration curve, the sensitivity of the sensor is 0.25 (mA/cm$^2$)/(μg/mL). The limit of detection is given as LoD=3.3*(SD$_{blank}$)/slope and the corresponding value for our case is found to be 0.04 μg/mL (0.8 μg/20 mL).

In some embodiments of the present invention, each component in the design for testing a sample may cause losses in the system. To quantify such losses for each component, a calibration curve was plotted equating the current difference as a function of concentration of SARS-CoV-2 S1 spike protein. Least squares linear regression was used to fit the data points ($R^2$=0.96). The approach consisted of recording responses from SARS-CoV-2 S1 spike protein in the concentration range 0.012 to 1.2 fg/L, during which 5 samples per concentration were tested. The obtained calibration equation was used for predicting the protein concentration of a sample. The calibration plot obtained by plotting the current different in μA for the different protein concentrations tested. The concentration of proteins in a sample solution were predicted using the calibration equation:

$$i(\mu A)=122.45\ c(\mu A)+25.2(\mu A).$$

Figures 11, 12:
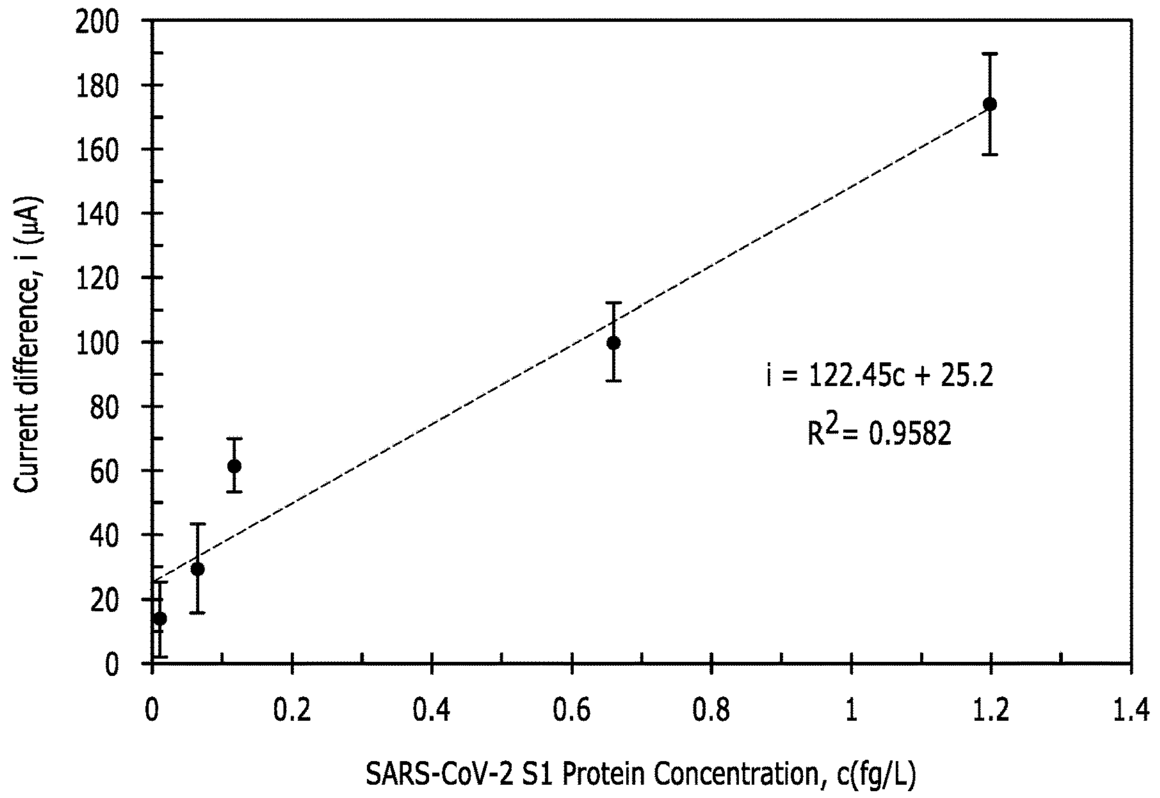
FIG. 11 depicts a graph of responses from SARS-CoV-2 S1 spike protein in concentration range 0.012 to 1.2 fg/L.
FIG. 12 depicts impinger results without dust filtration.

The calibration curve of FIG. 11, thus, in some embodiments indicates how the protein concentration may be determined based on the corresponding current response.

It is therefore that UFC-19 represents a transformational innovation to pandemic diagnostics, the testing results are a reliable alternative to widely screening approaches like temperature checks and antibody test for the following reasons: 1) this device tests the presence of the actual virus directly, not the immune response; 2) the immune responses leading to antibody titers take time for the body to mount it, like the onset of fever. In both cases, asymptomatic patients can be easily missed, but not with the UFC-19, as positive cases can be quarantined right away while awaiting for the molecular diagnosis; 3) The patients undergoing testing will not have to wait for hours or days to know the results; and 4) the epidemiological databases at the applicable Departments of Health can be updated almost instantly.

In applying the sensor of the present invention to airborne samples, electrolyte impingement must occur for proper testing of the collected and filtered air sample. Impingement occurs by diffusing an electrolyte composition into the collected air sample, allowing for interaction of potential viruses with the electrolyte for measuring chronoamperometry and compared to a reference sample obtained by calibrating the sensor probe. As air flows through the system, the viruses are capture in the electrolyte. Inside the sensor device there is standard electrolyte sample used as baseline. The difference in the measurement current between the baseline and the electrolyte is used for the assessment of the presence/absence of viruses. For example, positive differences in short times indicate the presence of Coronaviruses.

In one embodiment the present invention, an impinger is utilized to conduct the impingement described above. In such an embodiment, when using an impinger without any dust or dust filtration device, the results of FIG. 12 were obtained. In the experimental system, which included an impinge in which the collected air sample was diffused in an electrolyte composition, the sample was aerosolized with 1.75 L/min. Further, in the embodiment of the invention that produced the results of FIG. 12, samples were taken from the impinger and tested every five minutes.

For a 70 ml impinger solution of potassium hydroxide (KOH) with a pH of 12 and a corresponding aerosolizer solution of 250 ml of deionized water at a concentration of 1.5 fg/L, the test in the sample resulted in a true positive after 10 minutes. In this set of impinger results without dust or a dust filter, as shown in FIG. 12, the result remained a true positive when the sample was tested again 15 minutes after the sample was taken from the impinger.

For a 70 ml impinger solution of deionized water and a corresponding aerosolizer solution of 250 ml of deionized water at a concentration of 1.5 fg/L, the test in the sample resulted in a true positive after 10 minutes. In this set of impinger results without dust or a dust filter, as shown in FIG. 12, the result remained a true positive when the sample was tested again 15 minutes after the sample was taken from the impinger.

In such an embodiment, to detect in under 5 minutes the aerosolizer solution concentration was increased to 6 fg/L. Accordingly, for a 70 ml impinger solution of deionized water and a corresponding aerosolizer solution of 250 ml of deionized water at a concentration of 6 fg/L, the test in the sample resulted in a true positive after 5 minutes. In this set of impinger results without dust or a dust filter, as shown in FIG. 12, the result remained a true positive when the sample was tested again both 10 and 15 minutes after the sample was taken from the impinger. When aerosolized with 1.75

L/min for 5 min, the airflow particle concentration was calculated to be 0.0127 particles/L.

In another embodiment the UFC-19 device of the present invention utilizes a potentiostat for applying voltage and recording current response, but this function may alternatively use a simple electronic circuit instead of the potentiostat, thereby making the device even more portable for point-of-care use with reduced capital cost. In addition to this, the data obtained from the UFC-19 device can be stored in a cloud-based source to be processed and made available for viewing the results via a mobile app.

It is an additional embodiment that the present invention further brings significant relief in biosafety concerns related to SARS-CoV-2 research and clinical management, along with extra personal protective equipment (PPE) usage. All the measurements are carried out at pH 12, which is not compatible with physiological conditions needed for a virus to survive. Therefore, the testing conditions essentially destroy potentially infectious samples instantly, rendering any solutions non-infectious upon contact with the solution.

Example 1

Testing Procedure Using Sensor Probe

This example, describes a testing procedure that can be utilized with the sensor probe to detect a virus in a sample, in accordance with the invention.

In some embodiments, recombinant proteins can be safely handled under BSL1-2 conditions. For this example, the UFC-19 prototype was handled under BSL2+ environments, inside a biosafety cabinet. The standard operating procedure for each sample consisted of three steps namely cyclic voltammetry (activation), chronoamperometry (testing), and rinsing step. The electrochemical measurements were performed using a Gamry Framework software associated with Gamry Reference 600+ Potentiostat.

In the example, the first step included cyclic voltammetry. In this embodiment, the cyclic voltammetry (CV) experiments were performed using a nickel working electrode (5 mm diameter) inserted in a rotating disk electrode setup (Pine Instrument Company MSRX Speed Control Analytical Rotator), platinum ring counter electrode (ESPI metals, 0.75"×0.2"×0.005") placed concentric to working electrode and a platinum foil (ESPI metals, 0.3"×0.1"×0.005") used as pseudo reference electrode. Further, in this embodiment, the electrolyte was 20 mL of commercially purchased 1N KOH solution. The CVs were performed in a potential window of 0.20 to 0.60 V and scan rate of 15 mV/s for 5 cycles, with the fifth cycle being the sustained periodic cycle.

In Example 1, following the CV curve generation, the step of chronoamperometry was begun. For this step in Example 1, the sample for testing was prepared by adding the desired amount of protein or saliva and diluting it to 19.3 mL using PBS solution. A solution of 0.7 mL 1N KOH was added to this solution to bring the pH to 12. In these embodiments, chronoamperometry experiments were performed at pH 12 and 1600 rpm. This 20 mL of as-prepared solution was the test solution used. Specifically, chronoamperometry was performed by recording the open circuit potential for 60 seconds followed by a fixed oxidation potential of 0.58 V vs. Pt for 5 seconds and a fixed reduction potential of 0.10 V vs. Pt for 15 seconds.

For the example, following the draining of the test solution, fresh 1N KOH solution was pumped in and held idle for 30 seconds to disinfect the chamber. This process was repeated twice before moving to the activation for subsequent test.

In the embodiment, the experiment continued with the data analysis of Example 1. The data obtained from Gamry Framework software were imported to Microsoft Excel (2016 version) for data analysis. The error bars presented in the plots include the positive and negative deviations from the average currents of triplicate measurements.

Additionally, in this Example 1, Human saliva samples were obtained from consenting individuals who did not have any history of SARS-CoV-2 infection. The samples were triple-blinded to mask the identity of the donors.

Example 2

Airborne Sensor Probe

The airborne virus sensor of the present invention is shown in FIG. 2 for the A-UFC-19. In one embodiment the present invention compatible with commercial air indoor monitoring electrochemical sensors (e.g., CO, $CO_2$), in which an electrolyte is maintained in the system to perform analysis. However, the present invention does not require the liquid impinger to be collected in a culture media to keep the virus alive, as the UFC-19 measurement is based on disintegration of viral particles to release the viral proteins with the aid of the KOH electrolyte and their interaction with the NiOOH electrocatalyst as described herein. As shown in FIG. 2, the present invention includes air purification and controlling (removal of dust, water, $CO_2$ and CO impurities), impingement of the aerosol virus (containers 1, 2, and 3) in electrolyte solution (e.g., KOH and/or PBS KOH mixtures, to be optimized); UFC-19 probe, and baseline/electrolyte solution (container/cartridge 4).

Step 1 Air Sampling Impurities Control: It is important to eliminate/minimize dust, humidity, CO, and $CO_2$ in the air samples to achieve longer operation life without the requirement of electrolyte solution cartridge replacement. The presence of dust in the electrolyte/sampling collection can affect virus detection. Similarly, the $CO_2$ in the air can cause a change in pH with time (e.g. converting the KOH electrolyte into $K_2CO_3$) and humidity can dilute the electrolyte/sampling collection testing solution. Thus, the ambient air will be regulated (after a forced convection unit) with dust, humidity, CO, and $CO_2$ filters as shown in FIG. 2. After the ambient air is filtered, it is directed to the containers via a 3-way solenoid valve, periodically, and for exemplary purposes, every 5 minutes. For the present Example 2, in the first 5 minutes, the first container will be impinged, while the second container is getting tested for SARS-CoV-2 and discharged to the third container. Similarly, the first container will be tested while the second container is impinged with air samples. This cycle will allow continuous sample diffusion from air to the solution while other containers are occupied for testing. Recirculation of the testing solution in the cartridges will improve mixing.

Step 2 Reference solution: Before the sample in the first container is fed to the probe, the 1M KOH (reference solution) in the fourth cartridge is directed to the probe for catalyst formation using cyclic voltammetry (this process to take <3 minutes for the current Example 2). After the catalyst is formed, chronoamperometry is performed where a fixed potential is applied to achieve a baseline reading with this reference sample that does not contain any air samples (2 s).

Step 3 Sample Testing: As shown in FIG. 2, after the air samples are diffused in the electrolyte solution that is in the second container/cartridge, and a baseline reading is obtained with the sensor probe, the air-impinged sample will be directed to the probe for measurement. A chronoamperometry with conditions similar to that of baseline will be performed. Current signals from air diffused solution is then compared with the baseline to determine the presence or absence of SARS-CoV-2 in the solution. After the solution sample is tested, it is discharged from the probe to the third sample container to continue the test cycles.

The present invention is capable of demonstrating signatures of SARS-CoV-2 in a controlled air environment including environmental factors (temperature, relative humidity), environmental contaminants (dust, $CO_2$, CO), and other non-target virus contaminants (influenza and rhinovirus). Environmental contaminants can affect the signatures. Several approaches for air purification may be utilized (e.g., filters, membranes, adsorbents) in addition to the integration of the machine learning features of the processor. A feature level data fusion method with a deep convolutional neural network (DCNN) algorithm will be used to detect the presence of SARS-CoV-2 automatically. The effect of extreme environmental conditions on sensor readings and the mitigation of these extreme conditions are determined as well as the required flow rate. The processor, including the utilization of machine learning via the processor networked with the sensor device of the present invention, provides a robust platform for the sensitivity, specificity, and false alarm rates required for the A-UFC-19 devices and will enable fast extension to other pathogens beyond SARS-CoV-2 in the future.

The present invention further confirms background response in the absence of viral proteins, followed by tests with proteins and the SARS-CoV-2 virus to find the signature(s) in order to evaluate the tolerance of the design to other gas contaminants versus pure air. Background signal without viral proteins will be obtained by passing the resultant inlet air into the electrolyte (only KOH electrolyte or PBS with KOH) via an air sampling technique for virus recovery (slit sampler or impingers). The signature (current responses) from the SARS-CoV-2 viral protein and SARS-CoV-2 will be distinguished. Electrolyte and air sampling technique for virus trapping in the electrolyte is further determined during this process for obtaining maximum separation of SARS-CoV-2 and SARS-CoV-2 protein signature from the background. Further experimentation of the present invention distinguishes the SARS-CoV-2 virus and the rest combinations of rhinovirus and H1N1 influenza virus proteins, with such differentiation observed as follows: 1. (SARS-CoV-2+H1N1+Rhino), 2. (SARS-CoV-2+H1N1), 3. (SARS-CoV-2+Rhino), 4 (SARS-CoV-2). Planned negative cases are as follows: 1. (H1N1+Rhino), 2. (H1N1), 3. (Rhino), 4. (No Virus).

Example 3

Airborne Sensing

Figure 9A:
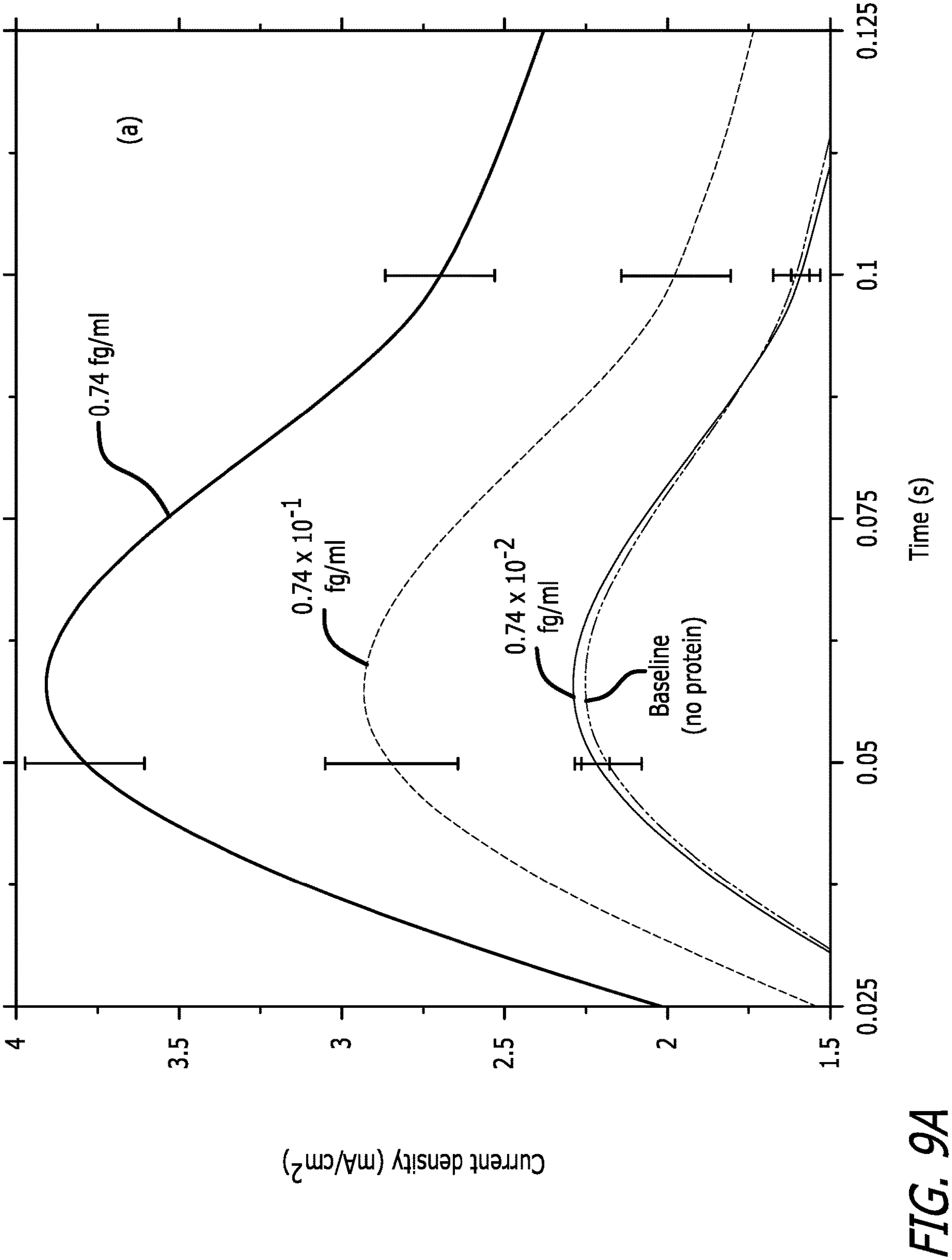
FIG. 9A depicts a chronoamperometry plot showing the current responses from the 0.74 fg/mL sample and its dilutions.
Figure 9B:
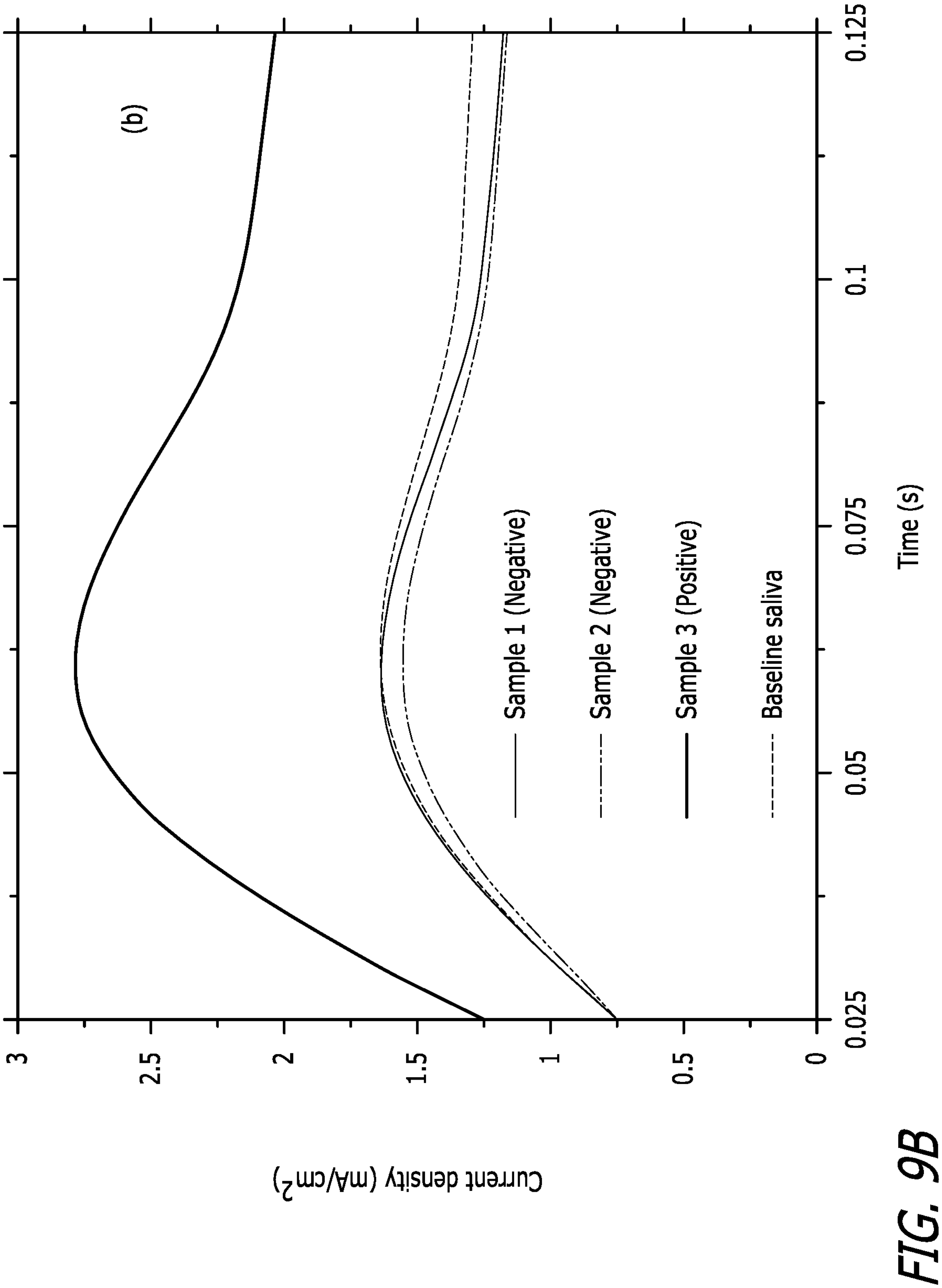
FIG. 9B depicts a chronoamperometry plot showing the negative samples in agreement with the baseline but the positive sample shows an increase in current indicating the detection of SARS-CoV-2 in the saliva of a PCR-confirmed COVID-19 positive sample.

The present invention is capable of detection of viral proteins as they interact with a locally formed electrocatalyst (forms in-situ when required without the use of any biorecognition element) during an electrochemical reaction (see Eq. 1) to produce the current signature. Further the present invention has the ability to distinguish SARS-CoV-2 from other viruses like Human Immunodeficiency Virus (HIV), or rhinovirus, inter alia, reinstating the robustness of the signature obtained from SARS-CoV-2. Evidence also suggests that the sensor can quantitatively detect the viral concentrations, a facet utilized in indicating the severity of the viral concentrations in air being tested. FIG. 9A shows the detection limit of the sensor in saliva samples (0.074 fg/mL). A clear separation is noticed for the 0.074 fg/mL sample indicating the detection limit since the 0.0074 fg/mL overlaps with the baseline. FIG. 9B shows the SARS-CoV-2 detection in COVID-19 affected and healthy saliva samples as compared to the baseline signal.

Figure 10:
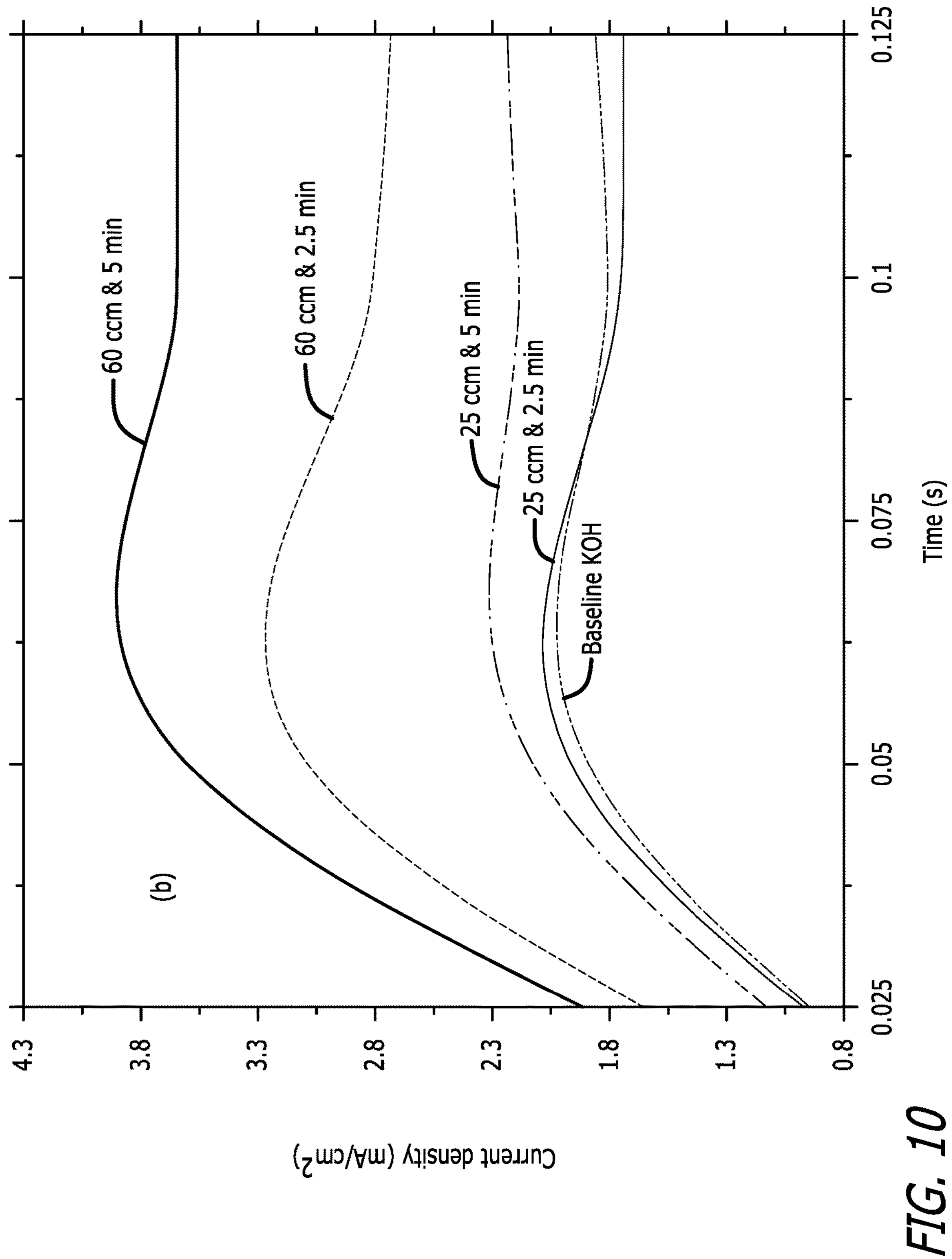
FIG. 10 depicts a chronoamperometry plot showing the increase in current signals by increasing the airflow rate and sampling time. Testing results are obtained within less than 0.1 s.

In an exemplary embodiment, the sensor probe of the present invention is capable of detecting aerosolized SARS-CoV-2 viral proteins. Utilizing aerosolized SARS-CoV-2 viral proteins in distilled water of concentration 0.74 ng/mL into incoming air, an impinger model for air sampling was utilized. Aerosolized particles were then collected into the sample solution (distilled water) and checked for the presence of the SARS-CoV-2 protein using the UFC-19 sensor probe of the present invention. Results shown in FIG. 10 (current response at an applied potential in less than 1 second) not only indicate successful detection of SARS-CoV-2 but also revealed that by tuning the air flow rate and sampling time, the ability to increase the aerosolization of the viral proteins is seen through an increase in resulting current response. This studies of obtaining airflow and sampling times confirm the ability for continuous indoor air monitoring of rooms and workspaces for alerting the personnel at the very instance SARS-CoV-2 is detected in the surrounding air.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Example 4

Dust and Dust Filter Exemplary Experimental Setup: Original Concept

This example, describes an experimental system and procedure that can be utilized for impingement of the aerosol virus in an electrolyte solution to permit the sensor probe to detect a virus in a sample, in accordance with the invention.

Figure 13A:
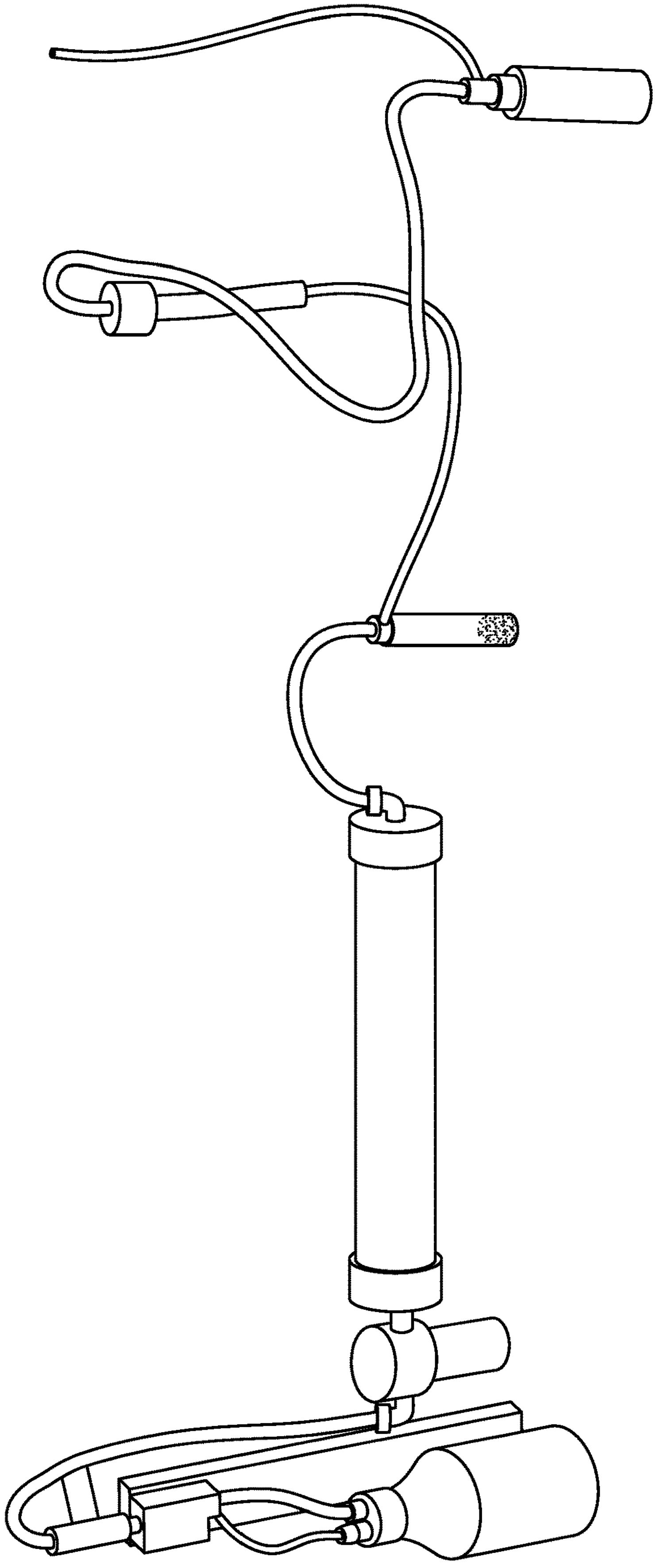
FIG. 13A depicts an exemplary dust filtration embodiment having a dust fluidizer and dryer.

In an exemplary embodiment, illustrated through FIG. 13A, a dust filtration embodiment that included dust, a dust filter 1307, and a dryer 1305 was tested. In such an embodiment, an aerosolizer 1301 is operatively connected to a regulator 1302 and compressed air 1303. While the aerosolizer 1301 of FIG. 13A is initially filled with deionized water, through the regulator 1302 and compressed air 1303 has SARS-CoV-2 S1 proteins added into the aerosolizer 1301. From this, there is a simulation of air with SARS-CoV-2 Aerosols.

Figure 19:
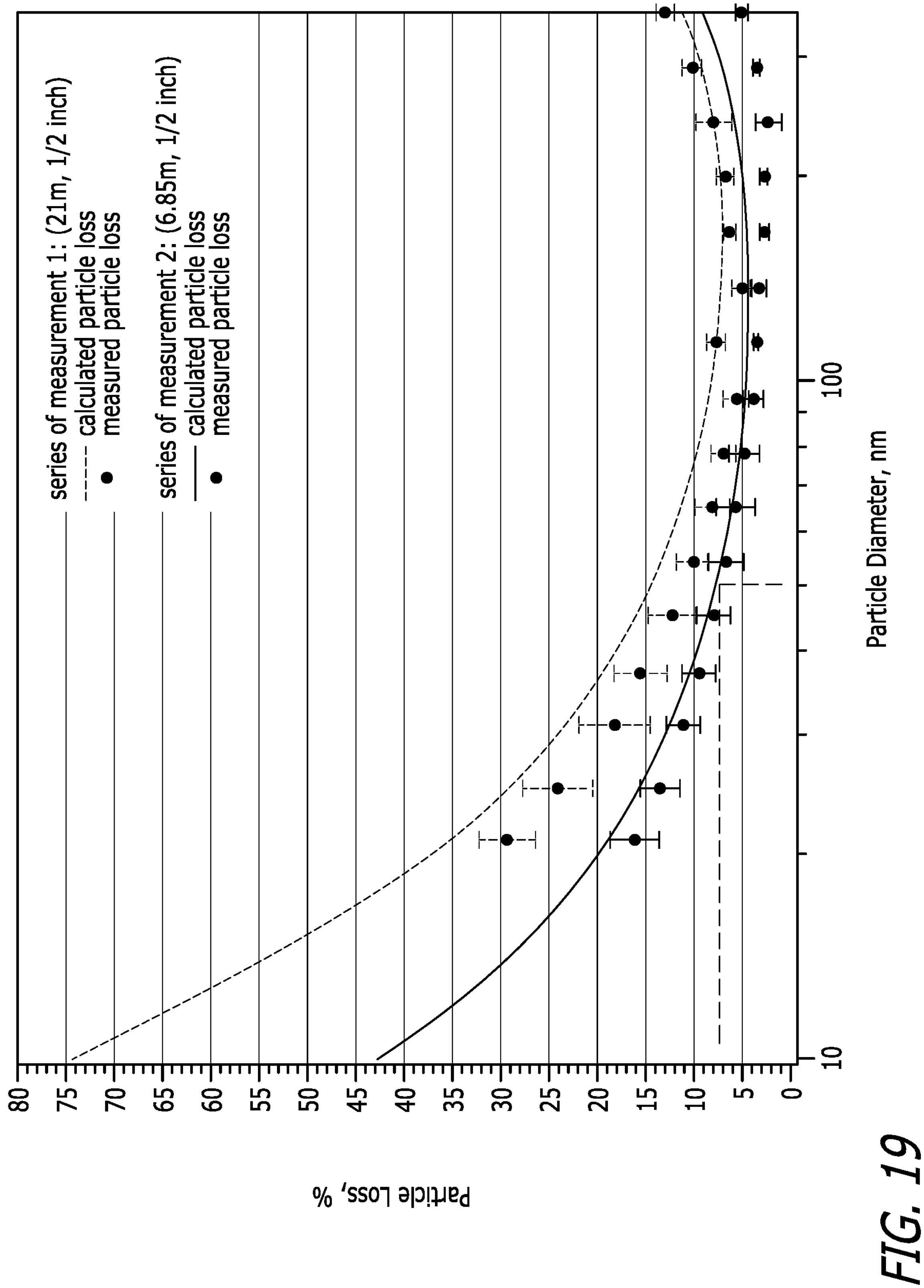
FIG. 19 depicts a chart showing particle loss assessments.

Following, as the aerosolizer is operatively connected to a cyclone filter 1304, the SARS-CoV-2 Aerosols are passed through the cyclone filter 1304 to the diffusion dryer 1305. FIG. 19 illustrates the particle loss that can occur as the SARS-CoV-2 Aerosols are passed through the diffusion (or aerosol) dryer 1305. For SARS-CoV-2, the lowest particle diameter is approximately 50 nm. Thus, as shown by FIG. 19, the maximum amount of loss for a 6.85 m dryer will be approximately 8%. The exemplary embodiments utilize a 0.5 m dryer, which corresponds to approximately 0.6% calculated particle loss. Therefore, for the exemplary embodiments, an expected 99.4% of the virus would pass through the dryer 1305.

Based on operative connections, the filtered and dried SARS-CoV-2 Aerosols reach the impinger (or dust fluidizer) 1306. From the impinger 1306, samples may be collected for testing and remaining Aerosols are passed through a dust filter 1307 to a potassium hydroxide trap 1308. The remaining Aerosols are disposed of through the venting 1309 out of the potassium hydroxide trap 1308.

Figure 13B:
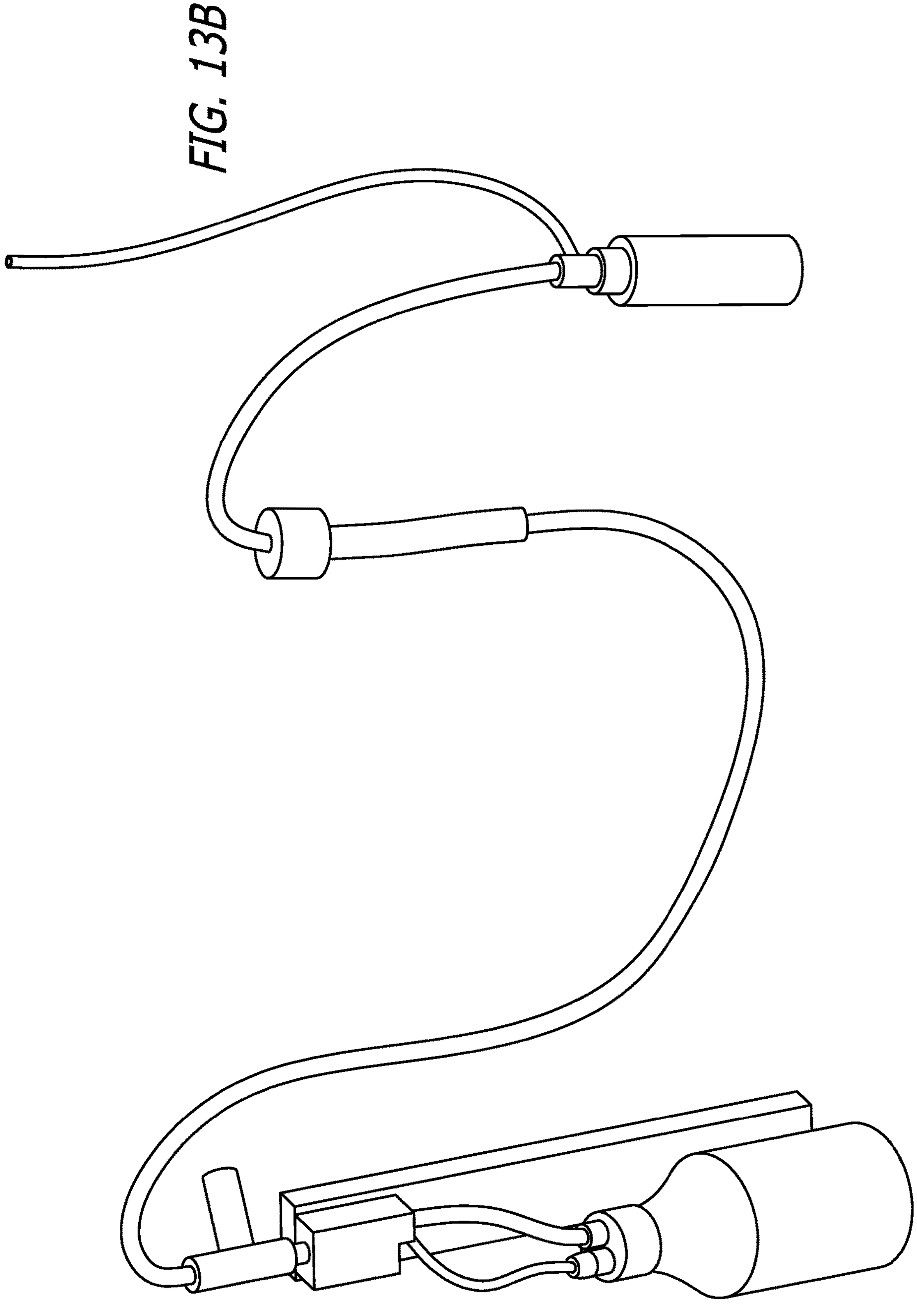
FIG. 13B depicts an exemplary dust filtration embodiment having only a dust filter.

In another exemplary embodiment, illustrated through FIG. 13B, a dust filtration embodiment that included a dust filter 1307—but neither dust nor a dryer 1305—was tested. In this embodiment, similar to FIG. 13A, an aerosolizer 1301 is operatively connected to a regulator 1302 and compressed air 1303. However, unlike in FIG. 13A, in the exemplary embodiment of 13B, the SARS-CoV-2 Aerosols are passed directly through a dust filter 1307 to a potassium hydroxide trap 1308. Thus, in such an embodiment, there is no introduction of dust nor drying occurring. In the embodiment of FIG. 13B, the Aerosols are disposed of through the venting 1309 out of the potassium hydroxide trap 1308.

Figure 14:
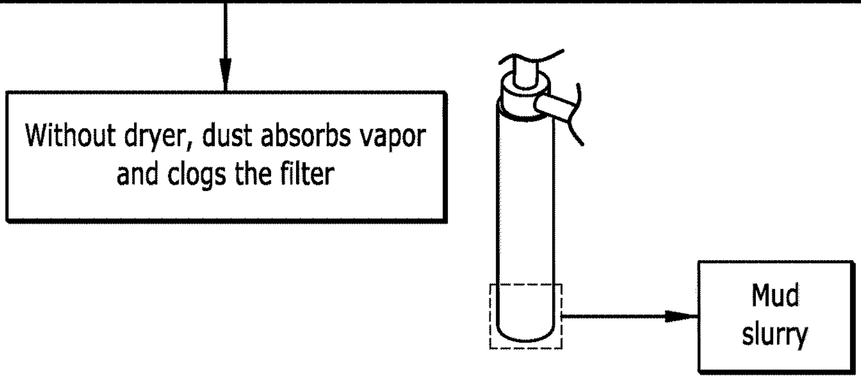
FIG. 14 depicts test results using various dust and dust filtration.

For tests conducted on the experimental system of FIG. 13A, the dust was at a concentration 350 M particles/$m^3$, ten times more than the expected amount of dust present in room air. Additionally, for the tests conducted on the experimental system of FIG. 13A, 0.03 g of dust was added to the impinger (dust fluidizer) 1306 every 5 minutes. For tests conducted on the experimental systems of FIGS. 13A-13B, the aerosolizer solution was at a concentration of 15 fg/L, which corresponds to 0.032 particles/L. The test results for the experimental systems of FIGS. 13A-13B were recorded in FIG. 14. For embodiments that utilized only a dust filter 1307, without dust or a dryer 1305, the results indicated a true positive in the samples that were taken after 5 minutes and 10 minutes. For embodiments that utilized a dust filter 1307 and a dryer 1305, without any dust, the results indicated a true positive in the samples that were taken after 5 minutes and 10 minutes. For embodiments that utilized a dust filter 1307 and dust, without a dryer 1305, the results indicated a false negative for both tests when the samples were taken after 5 minutes and 10 minutes. For the embodiment that utilized a dust filter 1307, dust, and a dryer 1305 the results indicated a false negative for first test at 5 minutes, but showed a true positive when the samples was taken after 10 minutes. Additionally, For the embodiment that utilized a dust filter 1307, dust, and a dryer 1305 results of the second test indicated a true positive in the samples that were taken after 5 minutes and 10 minutes. The results in FIG. 14 indicate that without a dryer 1305, dust may absorb vapor and clog the filter.

Figures 15A, 15B:
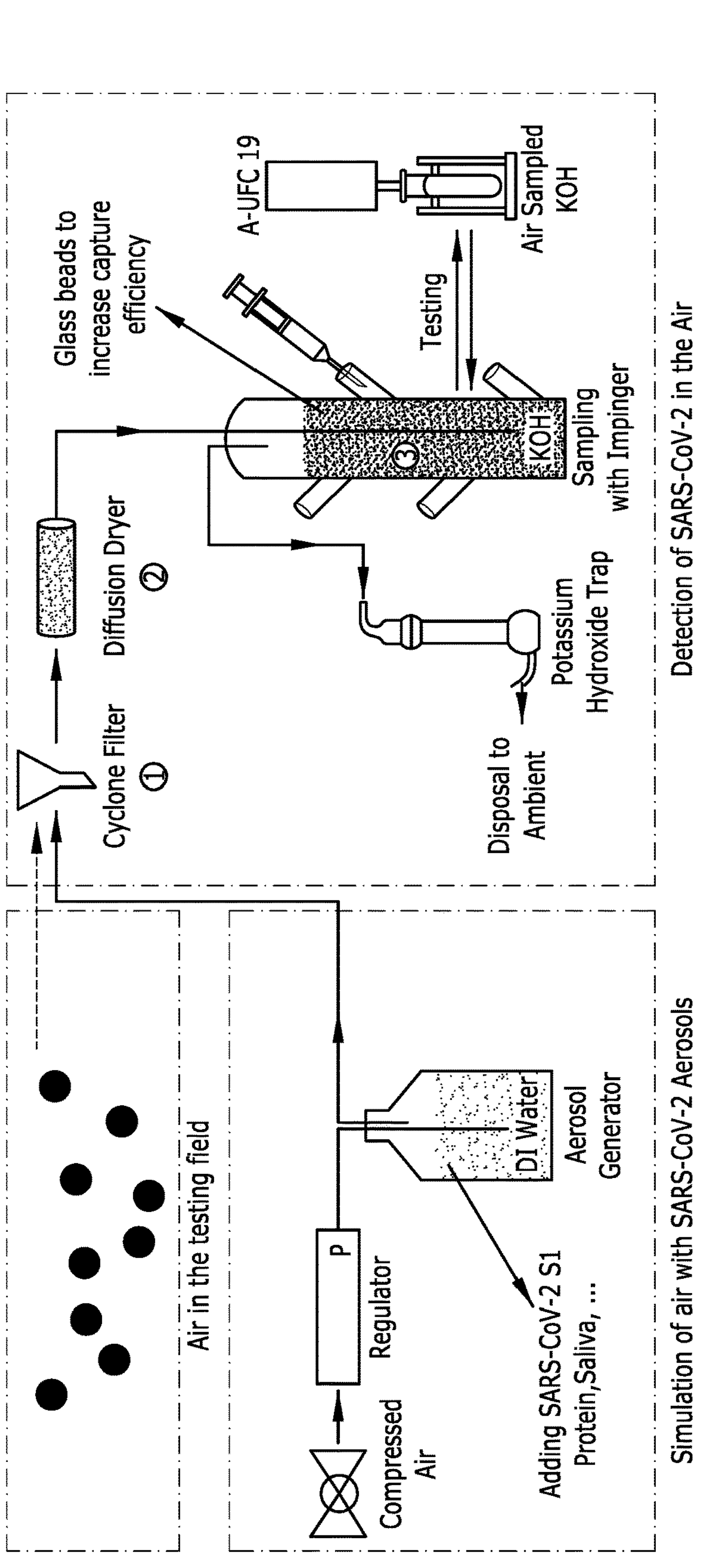
FIG. 15A depicts a test configuration of the present invention.
FIG. 15B depicts test results utilizing the configuration of FIG. 15A.

To determine the capture efficiency, the exemplary test configuration of FIG. 15A was utilized. FIG. 15A, similar to FIG. 13A, includes an aerosolizer 1301 is operatively connected to a regulator 1302 and compressed air 1303. In this exemplary test configuration, the compressed air 1303 is passed through the regulator 1302 to introduce a specific amount of compressed air 1303 to the aerosolizer 1301. The aerosolizer 1301 is filed with deionized water that may have SARS-CoV-2 S1 proteins or saliva added. From this, there is a simulation of air with SARS-CoV-2 Aerosols, which are the operatively transported to the cyclone filter 1304. In addition to the SARS-CoV-2 Aerosols, air in the testing field 1501, is passed through the cyclone filter 1304. Following this, the combined air in the testing field 1501 and SARS-CoV-2 Aerosols enter the diffusion dryer 1305.

After leaving the diffusion dryer 1305, the exemplary test configuration of FIG. 15A passes the combined air sample to an impinger 1306. In some embodiments, the impinger 1306 may be filed with glass beads to increase capture efficiency. From the impinger 1306, samples may be taken by a syringe 1502 from a sampling port 1503. These samples of air sampled KOH may then be tested by the Ultra-fast Air COVID-19 sensor (A-UFC-19) 1504. The remaining combined air sample in the impinger 1306 is operatively sent to the potassium hydroxide trap 1308 and disposed to ambient air.

FIG. 15B depicts test results utilizing the configuration of FIG. 15A. Using the test configuration of FIG. 15A, each test resulted in 96% of the virus leaving the dust filter 1304 and 99.4% of the virus leaving the dryer 1305. After an impingement time of 5 minutes, the efficiency of the trap (Impinger/beads) was found to be 34%, 99%, and 99% for the three respective tests. For the final concentration in the liquid phase, the results of FIG. 15B highlight that there were 40.555 particles/L, 1118.087 particles/L, and 1.1012 particles/L, for the respective tests. This is equivalent to final concentrations in the liquid phase of 0.608 fg/L, 1.771 fg/L, and 0.015 fg/L, respectively.

Example 5

Exemplary Experimental Setup: Wet Impinger Design

This example, describes a wet impinger experimental system and procedure that can be utilized for impingement of the aerosol virus in an electrolyte solution to permit the sensor probe to detect a virus in a sample, in accordance with the invention.

Figures 16A, 16B:
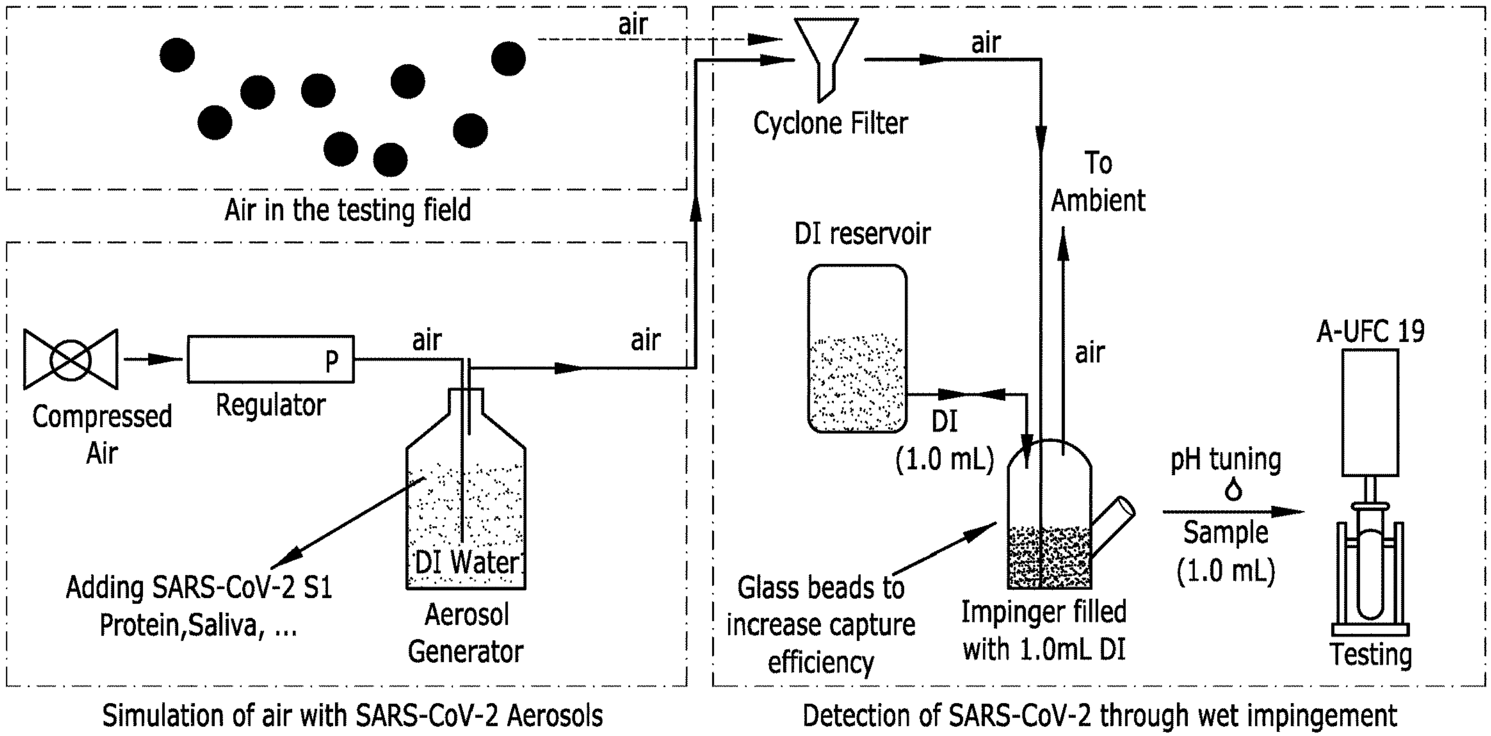
FIG. 16A depicts a test configuration with wet impingement design.
FIG. 16B depicts test results utilizing the configuration of FIG. 16A.

To determine the capture efficiency of a wet impinger design, the exemplary test configuration of FIG. 16A was utilized. FIG. 16A, similar to FIG. 13A, includes an aerosolizer 1301 is operatively connected to a regulator 1302 and compressed air 1303. In this exemplary test configuration, the compressed air 1303 is passed through the regulator 1302 to introduce a specific amount of compressed air 1303 to the aerosolizer 1301. The aerosolizer 1301 is filed with deionized water that may have SARS-CoV-2 S1 proteins or saliva added. From this, there is a simulation of air with SARS-CoV-2 Aerosols, which are the operatively transported to the cyclone filter 1304. In addition to the SARS-CoV-2 Aerosols, air in the testing field 1501, is passed through the cyclone filter 1304.

After leaving the cyclone filter 1304, the exemplary test configuration of FIG. 16A passes the combined air sample to a wet impinger 1601 filed with 1.0 mL deionized water. In some embodiments, the wet impinger 1601 may be filed with glass beads to increase capture efficiency. The deionized water comes from a deionized (DI) water reservoir 1602. From the wet impinger 1601, samples may be taken from a sampling port 1503. After a process of pH tuning, a 1.0 mL sample may then be tested by the Ultra-fast Air COVID-19 sensor (A-UFC-19) 1504.

FIG. 16B depicts test results utilizing the configuration of FIG. 16A. Using the test configuration of FIG. 16A, both tests resulted in 96% of the virus leaving the dust filter 1304. After a collection time of 5 minutes, the efficiency of the Wet Impinger trap 1601 was found to be 99% and 34% for the two respective tests. For the final concentration in the liquid phase, the results of FIG. 16B highlight that there were 4.752 particles/L and 1.632 particles/L, for the respective tests. This is equivalent to final concentrations in the liquid phase of 0.071 fg/L and 0.024 fg/L, respectively.

Figure 20B:
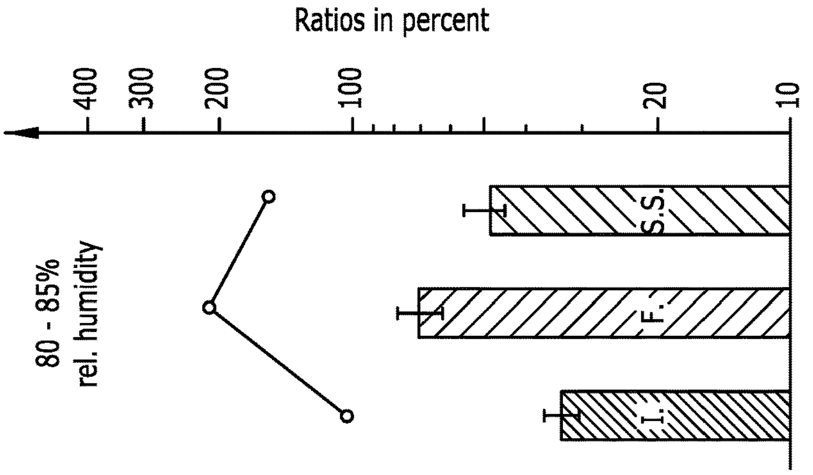
FIG. 20B depicts a chart showing virus capture efficiency from impingement (I), filter (F.), or an impinger according to a standard procedure (S.S.).
Figure 20A:
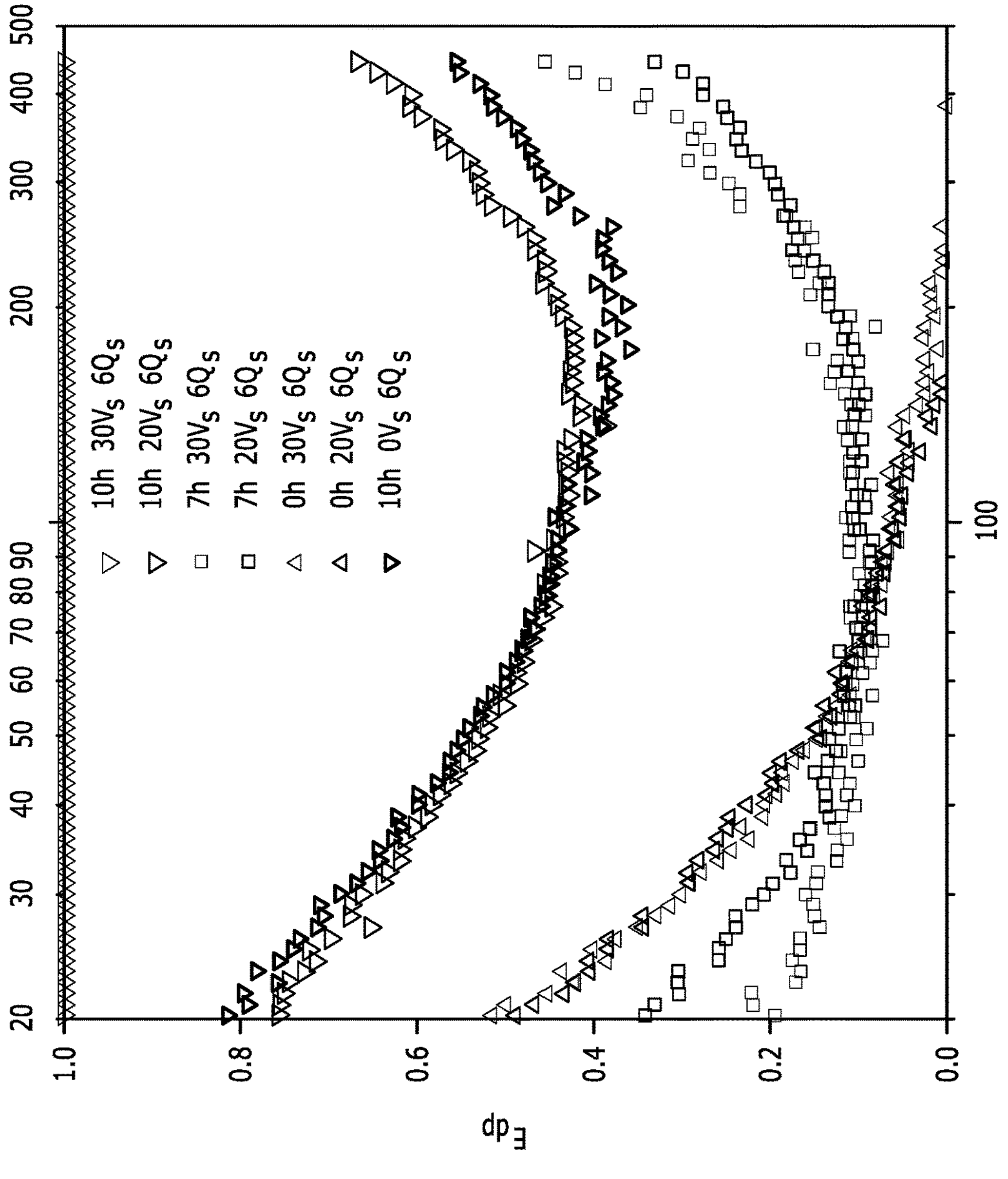
FIG. 20A depicts a chart showing particle collection efficiencies of various impingement techniques.

FIG. 20A depicts a chart showing particle collection efficiencies of various impingement techniques. In respect to an embodiment utilizing a wet impinger that includes glass beads, such as used in exemplary test design FIG. 16A, the chart of FIG. 20A highlights that the efficiency could be greater than 99%. FIG. 20B depicts a chart showing virus capture efficiency from impingement, filter, or an impinger according to a standard procedure. For the test design of FIG. 16A, which corresponds with the "I" (or impinger) bar on the chart in FIG. 20B, there is a calculated percentage of H1N1 virus capture efficiency of approximately 35%.

Example 6

Exemplary Experimental Setup: Dry Impinger Design

This example, describes a dry impinger experimental system and procedure that can be utilized for impingement of the aerosol virus in an electrolyte solution to permit the sensor probe to detect a virus in a sample, in accordance with the invention.

Figures 17A, 17B:
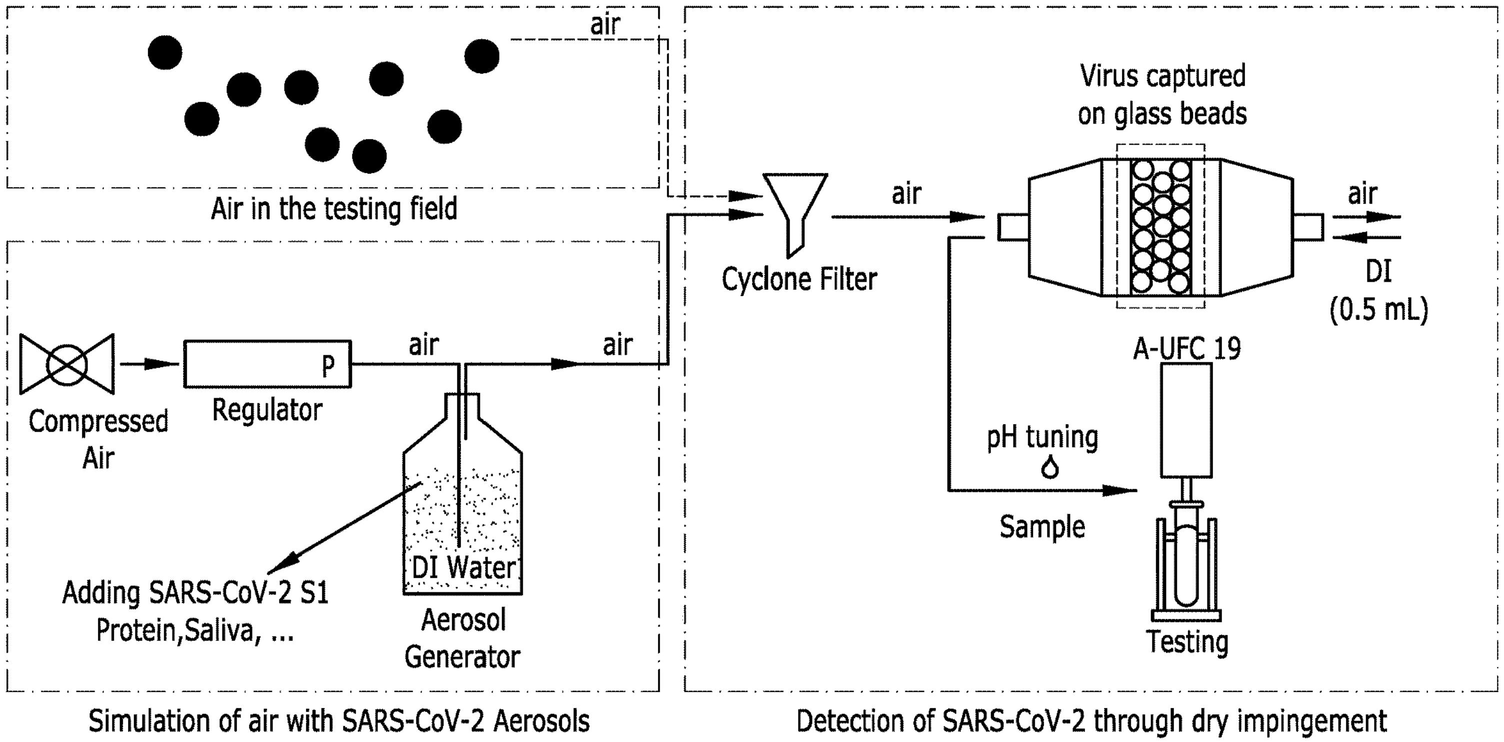
FIG. 17A depicts a test configuration with dry impingement design.
FIG. 17B depicts test results utilizing the configuration of FIG. 17A.

To determine the capture efficiency of a dry impinger design, the exemplary test configuration of FIG. 17A was utilized. FIG. 17A, similar to FIG. 13A, includes an aerosolizer 1301 is operatively connected to a regulator 1302 and compressed air 1303. In this exemplary test configuration, the compressed air 1303 is passed through the regulator 1302 to introduce a specific amount of compressed air 1303 to the aerosolizer 1301. The aerosolizer 1301 is filed with deionized water that may have SARS-CoV-2 S1 proteins or saliva added. From this, there is a simulation of air with SARS-CoV-2 Aerosols, which are the operatively transported to the cyclone filter 1304. In addition to the SARS-CoV-2 Aerosols, air in the testing field 1501, is passed through the cyclone filter 1304.

After leaving the cyclone filter 1304, the exemplary test configuration of FIG. 17A passes the combined air sample to a dry impinger 1701, in which the virus is captured on glass beads. The dry impinger 1701 passes air through the device and introduces 0.5 mL of deionized water. From the dry impinger 1701, samples are passed for pH turning. After a process of pH tuning, a sample may then be tested by the Ultra-fast Air COVID-19 sensor (A-UFC-19) 1504.

FIG. 17B depicts test results utilizing the configuration of FIG. 17A. Using the test configuration of FIG. 17A, both tests resulted in 96% of the virus leaving the dust filter 1304. After a collection time of 5 minutes, the efficiency of the Dry Impinger trap 1701 was found to be 36% and 36% for the two respective tests. For the final concentration in the liquid phase, the results of FIG. 17B highlight that there were 0.864 particles/L and 3.456 particles/L, for the respective tests. This is equivalent to final concentrations in the liquid phase of 0.013 fg/L and 0.052 fg/L, respectively.

FIG. 20A depicts a chart showing particle collection efficiencies of various impingement techniques. In respect to an embodiment utilizing a dry impinger that includes glass beads, such as used in exemplary test design FIG. 17A, the chart of FIG. 20A highlights that the efficiency is predicted to be 36% or greater. FIG. 20B depicts a chart showing virus capture efficiency from impingement, filter, or an impinger according to a standard procedure. For the test design of FIG. 17A, which corresponds with the "I" (or impinger) bar on the chart in FIG. 20B, there is a calculated percentage of H1N1 virus capture efficiency of approximately 35%.

Example 7

Exemplary Experimental Setup: Nano Filtration

This example, describes a nano filtration experimental system and procedure that can be utilized for impingement of the aerosol virus in an electrolyte solution to permit the sensor probe to detect a virus in a sample, in accordance with the invention.

Figures 18A, 18B:
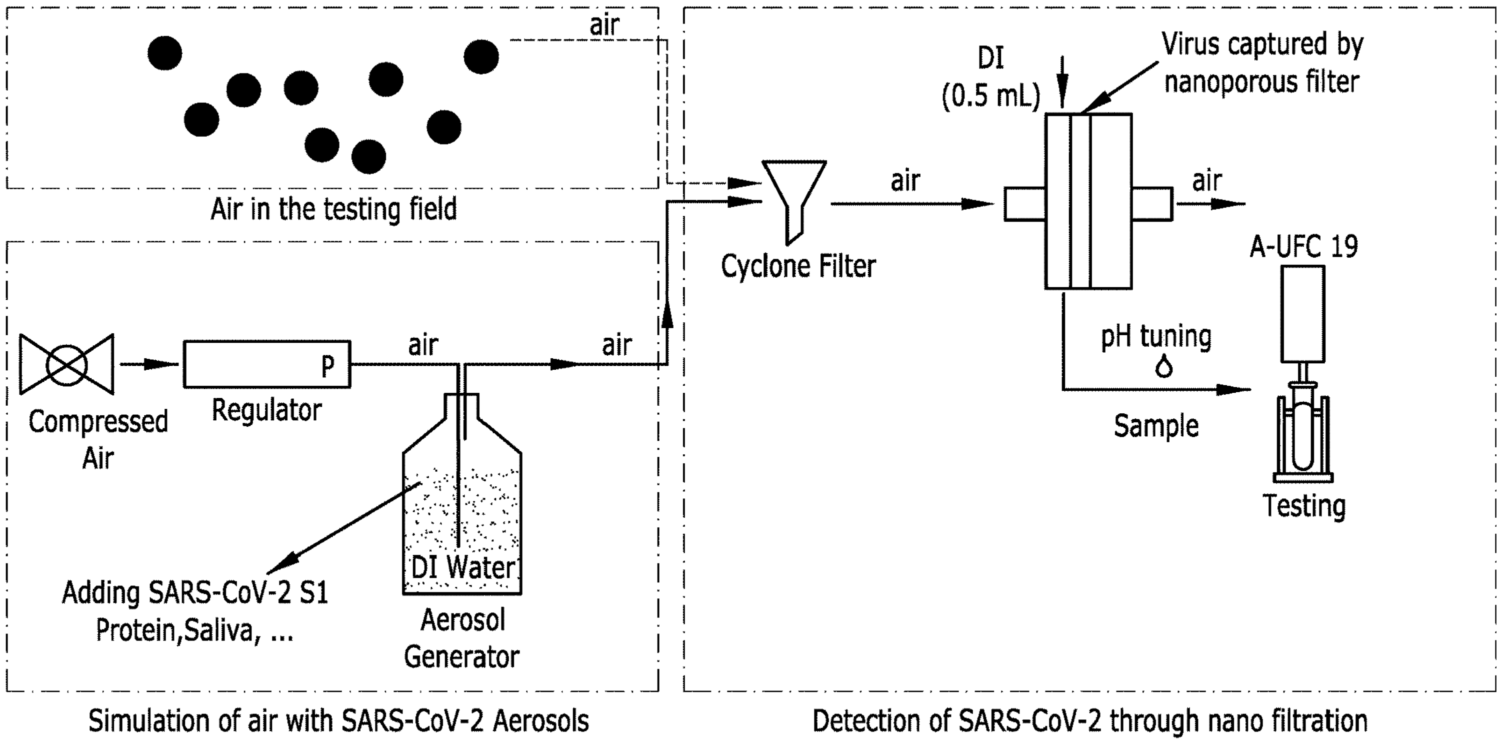
FIG. 18A depicts a test configuration with nano-filtration design.
FIG. 18B depicts test results utilizing the configuration of FIG. 18A.

To determine the capture efficiency of a nano filtration design, the exemplary test configuration of FIG. 18A was utilized. FIG. 18A, similar to FIG. 13A, includes an aerosolizer 1301 is operatively connected to a regulator 1302 and compressed air 1303. In this exemplary test configuration, the compressed air 1303 is passed through the regulator 1302 to introduce a specific amount of compressed air 1303 to the aerosolizer 1301. The aerosolizer 1301 is filed with deionized water that may have SARS-CoV-2 S1 proteins or saliva added. From this, there is a simulation of air with SARS-CoV-2 Aerosols, which are the operatively transported to the cyclone filter 1304. In addition to the SARS-CoV-2 Aerosols, air in the testing field 1501, is passed through the cyclone filter 1304.

After leaving the cyclone filter 1304, the exemplary test configuration of FIG. 18A passes the combined air sample to a nanoporous filter 1801, in which the virus is captured by the nanoporous filter. The nanoporous filter 1801 passes air through, while capturing the virus. From the nanoporous filter 1801, samples are passed for pH turning. After a process of pH tuning, a sample may then be tested by the Ultra-fast Air COVID-19 sensor (A-UFC-19) 1504.

FIG. 18B depicts test results utilizing the configuration of FIG. 18A. Using the test configuration of FIG. 18A, both tests resulted in 96% of the virus leaving the dust filter 1304. After a collection time of 5 minutes, the efficiency of the nanoporous filter 1801 was found to be 70% and 70% for the two respective tests. For the final concentration in the liquid phase, the results of FIG. 18B highlight that there were 1.68 particles/L and 6.72 particles/L, for the respective tests. This is equivalent to final concentrations in the liquid phase of 0.025 fg/L and 0.101 fg/L, respectively.

FIG. 20B depicts a chart showing virus capture efficiency from impingement, filter, or an impinger according to a standard procedure. For the test design of FIG. 18A, which corresponds with the "F" (or filter) bar on the chart in FIG. 20B, there is a calculated percentage of H1N1 virus capture efficiency of approximately 75%. Based on FIG. 20B, the virus capture efficiency through filtration is greater than that of an impinger according to a standard procedure.

REFERENCES

1. Xu, S. & Li, Y. Beware of the second wave of COVID-19. *The Lancet* 395, 1321-1322 (2020).
2. D'Arienzo, M. & Coniglio, A. Assessment of the SARS-CoV-2 basic reproduction number, RO, based on the early phase of COVID-19 outbreak in Italy. *Biosafety and Health* S2590053620300410 (2020) doi:10.1016/j.bshea1.2020.03.004.
3. Li, Q. et al. Early Transmission Dynamics in Wuhan, China, of Novel Coronavirus-Infected Pneumonia. *N Engl J Med* 382, 1199-1207 (2020).

4. Li, R. et al. Substantial undocumented infection facilitates the rapid dissemination of novel coronavirus (SARS-CoV-2). *Science* 368, 489-493 (2020).
5. Wang, D. et al. Clinical Characteristics of 138 Hospitalized Patients With 2019 Novel Coronavirus-Infected Pneumonia in Wuhan, China. *JAMA* 323, 1061 (2020).
6. Tang, Y.-W., Schmitz, J. E., Persing, D. H. & Stratton, C. W. Laboratory Diagnosis of COVID-19: Current Issues and Challenges. *J Clin Microbiol* 58, e00512-20, /jcm/58/6/JCM.00512-20.atom (2020).
7. Dheda, K. et al. Diagnosis of COVID-19: Considerations, Controversies and Challenges in South Africa. *WJCM* 2, 3 (2020).
8. Yang, S. & Rothman, R. E. PCR-based diagnostics for infectious diseases: uses, limitations, and future applications in acute-care settings. *The Lancet Infectious Diseases* 4, 337-348 (2004).
9. Gutierres, S. L. & Welty, T. E. Point-of-Care Testing: An Introduction. *Ann Pharmacother* 38, 119-125 (2004).
10. Gandhi, M., Yokoe, D. S. & Havlir, D. V. Asymptomatic Transmission, the Achilles' Heel of Current Strategies to Control Covid-19. *N Engl J Med* 382, 2158-2160 (2020).
11. Wang, W. et al. Detection of SARS-CoV-2 in Different Types of Clinical Specimens. *JAMA* (2020) doi:10.1001/jama.2020.3786.
12. Zou, L. et al. SARS-CoV-2 Viral Load in Upper Respiratory Specimens of Infected Patients. *N Engl J Med* 382, 1177-1179 (2020).
13. Kim, C. et al. Comparison of Nasopharyngeal and Oropharyngeal Swabs for the Diagnosis of Eight Respiratory Viruses by Real-Time Reverse Transcription-PCR Assays. *PLoS ONE* 6, e21610 (2011).
14. Blaschke, A. J. et al. Non-invasive sample collection for respiratory virus testing by multiplex PCR. *Journal of Clinical Virology* 52, 210-214 (2011).
15. Bilder, L., Machtei, E. E., Shenhar, Y., Kra-Oz, Z. & Basis, F. Salivary Detection of H1N1 Virus: A Clinical Feasibility Investigation. *J Dent Res* 90, 1136-1139 (2011).
16. Pasomsub, E. et al. Saliva sample as a non-invasive specimen for the diagnosis of coronavirus disease 2019: a cross-sectional study. *Clinical Microbiology and Infection* S1198743X20302780 (2020) doi:10.1016/j.cmi.2020.05.001.
17. Sindhu, S. & Jagannathan, N. Saliva: A Cutting Edge in Diagnostic Procedures. *Journal of Oral Diseases* 2014, 1-8 (2014).
18. Azzi, L. et al. Saliva is a reliable tool to detect SARS-CoV-2. *Journal of Infection* 81, e45-e50 (2020).
19. To, K. K.-W. et al. Consistent Detection of 2019 Novel Coronavirus in Saliva. *Clinical Infectious Diseases* ciaa149 (2020) doi:10.1093/cid/ciaa149.
20. Williams, E., Bond, K., Zhang, B., Putland, M. & Williamson, D. A. Saliva as a non-invasive specimen for detection of SARS-CoV-2. *J Clin Microbiol* JCM.00776-20, jcm; JCM.00776-20v1 (2020) doi:10.1128/JCM.00776-20.
21. Vedharathinam, V. & Botte, G. G. Understanding the electro-catalytic oxidation mechanism of urea on nickel electrodes in alkaline medium. *Electrochimica Acta* 81, 292-300 (2012).
22. Seo, G. et al. Rapid Detection of COVID-19 Causative Virus (SARS-CoV-2) in Human Nasopharyngeal Swab Specimens Using Field-Effect Transistor-Based Biosensor. *ACS Nano* 14, 5135-5142 (2020).
23. Thévenot, D. R., Toth, K., Durst, R. A. & Wilson, G. S. ELECTROCHEMICAL BIOSENSORS: RECOMMENDED DEFINITIONS AND CLASSIFICATION*. *Analytical Letters* 34, 635-659 (2001).
24. Kliger, Y. & Levanon, E. Y. Cloaked similarity between HIV-1 and SARS-CoV suggests an anti-SARS strategy. *BMC Microbiology* 7 (2003).
25. Khodamoradi, Z., Moghadami, M. & Lotfi, M. Co-infection of Coronavirus Disease 2019 and Influenza A: A Report from Iran. *Arch Iran Med* 23, 239-243 (2020).
26. Kim, D., Quinn, J., Pinsky, B., Shah, N. H. & Brown, I. Rates of Co-infection Between SARS-CoV-2 and Other Respiratory Pathogens. *JAMA* 323, 2085 (2020).
27. Konala, V. M. et al. Co-infection with Influenza A and COVID-19. *European Journal of Case Reports in Internal Medicine* 7, 1 (2020).
28. Altuntas Aydin, O., Kumbasar Karaosmanoglu, H. & Kart Yasar, K. HIV/SARS-CoV-2 coinfected patients in Istanbul, Turkey. *J Med Virol* jmv.25955 (2020) doi:10.1002/jmv.25955.
29. Zhu, F., Cao, Y., Xu, S. & Zhou, M. Co-infection of SARS-CoV-2 and HIV in a patient in Wuhan city, China. *J Med Virol* 92, 529-530 (2020).
30. Parker, A. et al. HIV and SARS-CoV-2 co-infection: The diagnostic challenges of dual pandemics. *S Afr Med J* 110, (2020).
31. Wang, W.-K. et al. Detection of SARS-associated Coronavirus in Throat Wash and Saliva in Early Diagnosis. *Emerg. Infect. Dis.* 10, 1213-1219 (2004).
32. Liu, L. et al. Epithelial Cells Lining Salivary Gland Ducts Are Early Target Cells of Severe Acute Respiratory Syndrome Coronavirus Infection in the Upper Respiratory Tracts of Rhesus Macaques. *Journal of Virology* 85, 4025-4030 (2011).
33. Xu, J., Li, Y., Gan, F., Du, Y. & Yao, Y. Salivary Glands: Potential Reservoirs for COVID-19 Asymptomatic Infection. *J Dent Res* 002203452091851 (2020) doi:10.1177/0022034520918518.
34. Sabino-Silva, R., Jardim, A. C. G. & Siqueira, W. L. Coronavirus COVID-19 impacts to dentistry and potential salivary diagnosis. *Clin Oral Invest* 24, 1619-1621 (2020).
35. Humphrey, S. P. & Williamson, R. T. A review of saliva: Normal composition, flow, and function. *The Journal of Prosthetic Dentistry* 85, 162-169 (2001).
36. Lopin, P. & Lopin, K. V. PSoC-Stat: A single chip open source potentiostat based on a Programmable System on a Chip. *PLoS ONE* 13, e0201353 (2018).
37. Ramanujam and Botte. Online Sensor Device for Rapid *Escherichia coli* Detection in Water. In *ECS Meeting Abstracts;* 2018.
38. Jiang et al. COVID-19 Diagnostics: Technologies, Players and Trends. IDTechEx. (accessed Jun. 19, 2020).
39. Ramanujam, A.; Almodovar, S.; Botte, G. G. Ultra-fast Electrochemical Sensor for Point-of-Care COVID-19 Diagnosis using Non-invasive Saliva Sampling. under review, *J. Electrochem. Soc.* (October, 2020).
40. Botte, G. G.; Ramanujam, A. Rapid Viral Diagnostic Sensor, U.S. patent application Ser. No. 16/933,686 (2020).
41. Verreault, D., Moineau, S. & Duchaine, C. Methods for Sampling of Airborne Viruses. *Microbiol. Mol. Biol. Rev.* 72, 413-444 (2008).
42. Kenarkoohi, A. et al. Hospital indoor air quality monitoring for the detection of SARS-CoV-2 (COVID-19) virus. *Sci. Total Environ.* (2020) doi:10.1016/j.scitotenv.2020.141324.
43. Clean Room & ISO Classifications|https://www.americancleanrooms.com/cleanroom-classifications/.

44. Mold Course Chapter 2: |Mold|US EPA. https://www.epa.gov/mold/mold-course-chapter-2.
45. Ray, G. C. & Johnson, P. H. U.S. Pat. No. 2,519,284A—Method of absorbing carbon monoxide (1946).
46. Balu, A. et al. A Deep Learning Framework for Design and Analysis of Surgical Bioprosthetic Heart Valves. *Sci. Rep.* 9, 1-12 (2019).
47. Huang, S. C., Pareek, A., Seyyedi, S., Banerjee, I. & Lungren, M. P. Fusion of medical imaging and electronic health records using deep learning: a systematic review and implementation guidelines. *npj Digital Medicine* (2020) doi:10.1038/s41746-020-00341-z.
48. C. D. Cooper and F. C. Alley, Air Pollution Control: A Design Approach (Fourth Ed., Waveland Press, 2010).
49. S.-L. von der Weiden, et al., "Particle Loss Calculator—a new software tool for the assessment of the performance of aerosol inlet systems," 2 Atmospheric Measurement Techniques 479, (Sep. 1, 2009).
50. K.-P. Yu, et al., "Improving the collection efficiency of the liquid impinger for ultrafine particles and viral aerosols by applying granular bed filtration," 101 Journal of Aerosol *Science* 133-143 (2016).
51. Sartorius, Collection of Viruses and Phages with the Gelatin Membrane Filter Method. https://www.n-genetics.com/products/1249/1033/13673.pdf.

The invention claimed is:

1. A sensor for detecting an airborne virus comprising:
(a) an apparatus comprising:
(i) an air purification and control module;
(ii) a first chamber for containing an air sample impinged by an electrolyte solution;
(iii) a sensor comprising a sensor tip; and
(iv) a second chamber for containing a reference solution; and
(b) wherein the sensor tip comprising:
(i) a working electrode, wherein the working electrode comprises
(A) a conductive material, wherein the conductive material is resistant to corrosion,
(B) a support, and
(C) a catalyst;
(ii) a counter electrode comprising an electrocatalyst, wherein the counter electrode is operably connected to the working electrode, the sensor tip when introduced to an air sample impinged by an electrolyte, is operable for detecting change in current utilizing the working electrode and the counter electrode, and the sensor tip is operable for detecting the virus by the change in current.

2. The sensor of claim 1 further comprising a reference electrode comprising a reference material.

3. The sensor of claim 2, wherein the sensor tip when introduced to the air sample is operable for detecting change in current utilizing the reference material in combination with the working electrode and the counter electrode.

4. The sensor of claim 1, wherein the support is selected from a group consisting of Nickel, Nickel gauze, Nickel mesh, Ti, stainless steel, Hastelloy, graphite, nickel foam, Ti foam, Aluminum, Aluminum foam, carbon, carbon fibers, graphene, and graphene metal composites, and combinations thereof.

5. The sensor of claim 1, wherein the catalyst comprises a transition metal.

6. The sensor of claim 5, wherein the transition metal is selected from a group consisting of Ni, Fe, Co, Cr, Mo, Rh, Ru, Pd, Ir, Au, Pt, composites of graphene metal, and combinations thereof.

7. The sensor of claim 5, wherein the transition metal comprises Ni.

8. The sensor of claim 1, wherein the support comprises the catalyst.

9. The sensor of claim 1, wherein the electrocatalyst is selected from a group consisting of Pt, Au, Ir, Ni, Ti, Rh, Ru, and combinations thereof.

10. The sensor of claim 1, wherein the virus being detected is selected from a group consisting of airborne viruses, coronavirus (SARS-COV-2), coronavirus, rhinovirus, varicella virus, measles, mumps, hantavirus, pandemic viruses, virus-laden particles and combinations thereof.

11. The sensor of claim 1, wherein the sensor is operable for detecting the virus within a time period in the range between 10 milliseconds and 10 seconds.

12. The sensor of claim 11, wherein the sensor is operable for detecting concentration of a second virus in the sample.

13. The sensor of claim 1, wherein the sensor is operable for detecting the virus within 100 milliseconds.

14. The sensor of claim 1, wherein the sensor is operable for detecting concentration of the virus in an air sample.

15. The sensor of claim 1, wherein the electrolyte solution comprises one or more electrolytes selected from the group consisting of: KOH, PBS KOH, NaOH, ammonium solutions, phosphate buffers or combinations thereof, to be optimized and introduced into the air sample.

16. A method for detecting a virus with a sensor tip, the method comprising:
(a) selecting a sensor tip, wherein the sensor tip comprises
(i) a working electrode, wherein the working electrode comprises a conductive material,
(ii) a counter electrode, wherein the counter electrode comprises an electrocatalyst, and
(iii) a reference electrode, wherein the working electrode is operably connected to the counter electrode and the reference electrode;
(b) creating a catalyst locally on the sensor tip, wherein
(i) the catalyst is created at a particular voltage, and
(ii) the particular voltage corresponds to the working electrode and the reference electrode;
(c) collecting an air sample and impinging the collected air sample with an electrolyte solution;
(d) inserting the sensor tip into the collected air sample impinged with the electrolyte solution;
(e) applying a cell voltage between the working electrode and the reference electrode;
(f) calibrating a change in current between a reference sample; wherein
(i) the reference sample comprises a virus-free sample, and
(ii) the change in current is calibrated as a function of concentration of the virus present in the air sample.

17. The method of claim 16, wherein the virus being detected in the air sample is selected from a group consisting of airborne viruses, coronavirus (SARS-COV-2), coronavirus, rhinovirus, varicella virus, measles, mumps, hantavirus, pandemic viruses, virus-laden particles and combinations thereof.

18. The method of claim 16, wherein the sensor is operable for detecting the virus within 10 seconds.

19. The method of claim 16, wherein the sensor is operable for detecting the virus within 100 milliseconds.

20. The method of claim 16, wherein the air sample comprises multiple air samples to enable calibrating multiple probes simultaneously.

21. The method of claim 16, wherein the collected air sample impinged with the electrolyte solution comprises, a collected air sample, the electrolyte solution, and pH adjusting salts.

22. The method of claim 21, wherein the electrolyte solution is operable to transport the collected air sample across the media.

23. The method of claim 21, wherein the pH adjusting salts are selected from a group consisting of KOH, PBS KOH, NaOH, ammonium solutions, phosphate buffers, and combinations thereof, to be optimized and introduced into the air sample.

24. The method of claim 16, wherein the cell voltage is in a range between −0.5 V and 1.0 V relative to voltage of the reference electrode.

25. The method of claim 16, wherein the sensor is operable for detecting concentration of a second virus in the collected air sample.

* * * * *